United States Patent [19]
Carl et al.

[11] Patent Number: 6,023,134
[45] Date of Patent: Feb. 8, 2000

[54] POWER CONVERSION SYSTEM FOR BI-DIRECTIONAL CONVERSION BETWEEN HYDRAULIC POWER AND ELECTRICAL POWER

[75] Inventors: Udo Carl, Hamburg; Wolfgang Besing, Osterholz-Scharmbeck; Stefan Frischemeier, Hamburg, all of Germany

[73] Assignee: DaimlerChrysler Aerospace Airbus Gmbh, Hamburg, Germany

[21] Appl. No.: 08/958,416

[22] Filed: Oct. 27, 1997

[51] Int. Cl.⁷ .............................. H02K 7/18; F03B 13/00; F03B 3/10
[52] U.S. Cl. .......................... 318/140; 290/30 A; 290/43; 290/54; 60/404; 60/420; 60/911
[58] Field of Search .................................. 318/140; 290/9, 290/10, 11, 30 R, 30 A, 43, 54; 60/224, 639, 325, 582, 371, 403, 404, 419, 420, 423, 911

[56] References Cited

U.S. PATENT DOCUMENTS

| | | | |
|---|---|---|---|
| 3,631,256 | 12/1971 | Reynolds | 290/30 A |
| 4,413,698 | 11/1983 | Conrad et al. | 180/305 |
| 4,713,982 | 12/1987 | Fluegel et al. | 475/74 |
| 4,754,940 | 7/1988 | Deter | 244/75 R |

*Primary Examiner*—Bentsu Ro
*Attorney, Agent, or Firm*—W. F. Fasse; W. G. Fasse

[57] ABSTRACT

A bi-directional power conversion system interconnects hydraulic and electrical power systems on-board a vehicle such as an air-craft, whereby the power conversion system can selectively convert available electrical power to needed hydraulic power or vice versa. The power conversion system includes a hydraulic machine (15) connected to the hydraulic system (10) of the vehicle, an electrical machine (20) connected to the electrical system (3) of the vehicle through a power converter and control unit (22), a rotational drive shaft (14) mechanically interconnecting the hydraulic machine (15) and the electrical machine (20), and a priority and safety control unit (26) that controls the operation of the system. In a first operating mode, for example in the event of a failure of a primary electrical generator (2), the hydraulic machine (15) operates as a hydraulic motor driven by available hydraulic power from the hydraulic system (10) to drive the electrical machine (20) which operates as an electrical generator to provide electrical power into the electrical system (3). In a second operating mode, for example in the event of a failure of a primary hydraulic pump (9), the electrical machine (20) operates as an electric motor driven by electric power from the electrical system (3) to drive the hydraulic machine (15) operating as a hydraulic pump to provide hydraulic power into the hydraulic system (10). A hydraulic valve arrangement (18) and an electrical switch arrangement (21), as well as pressure and speed regulators are controlled by the control unit (26), and the system operation is monitored by sensors connected to the control unit (26), to activate the appropriate operating mode.

42 Claims, 10 Drawing Sheets

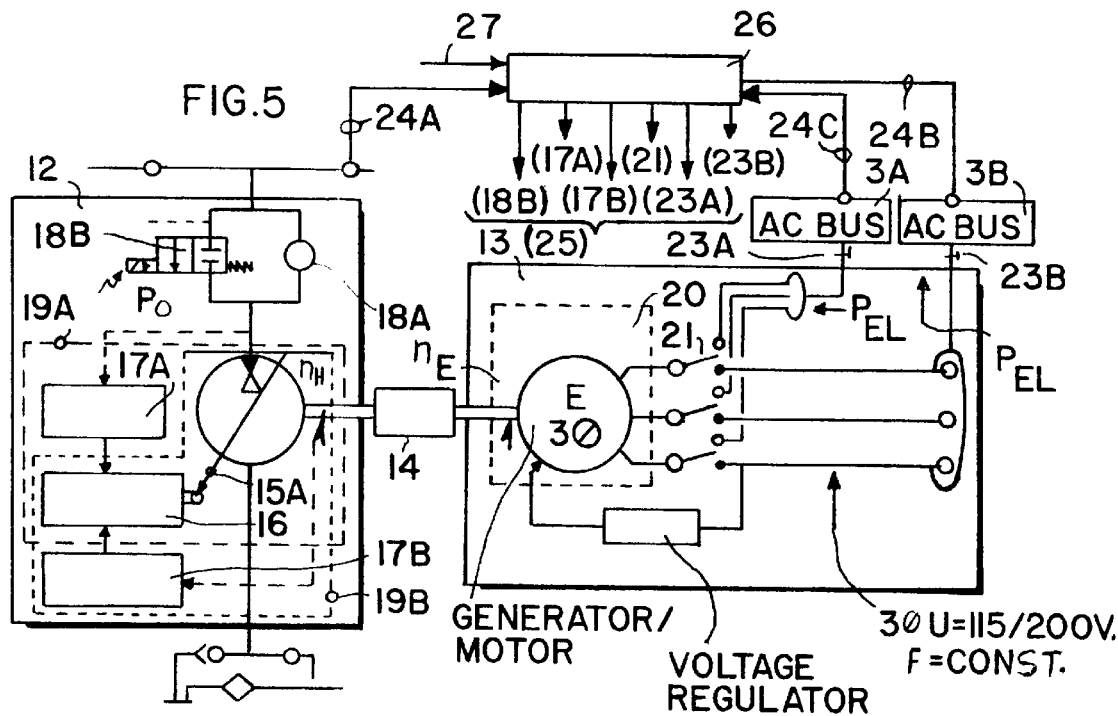
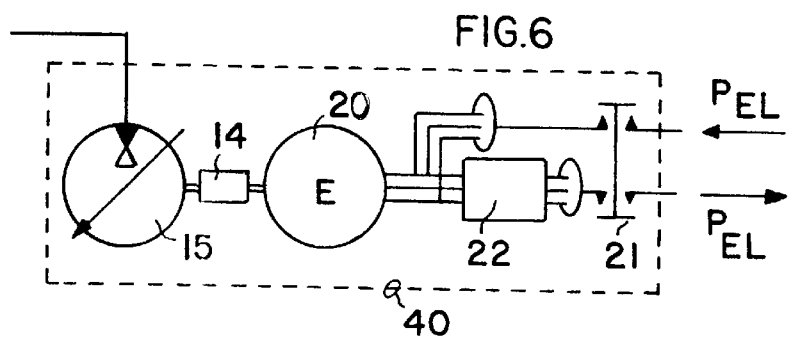

POWER CONVERSION SYSTEM FOR BI-DIRECTIONAL CONVERSION BETWEEN HYDRAULIC POWER AND ELECTRICAL POWER

FIELD OF THE INVENTION

The invention relates to a power conversion system for bi-directional conversion between hydraulic and electrical power, which are respectively to be provided to the power systems of a vehicle, and particularly the power systems on-board an air-craft. The electrical and/or hydraulic power needs at any time on-board the vehicle are met by appropriately and selectively bi-directionally converting and providing energy or power of the appropriate type (electrical or hydraulic) as needed.

BACKGROUND INFORMATION

The operational reliability of on-board power systems in known vehicles is largely ensured through the provision of plural autonomously operating energy sources, which provide hydraulic and/or electrical energy or power in a constant manner to the power consuming devices of various safety-critical energy systems installed within the power system of the vehicle. Namely, such critical components or systems installed in a vehicle include the hydraulic operating systems for controlling the vehicle, such as steering and braking systems, and various electrical or electronic systems including the electrical power management system and a computer system for navigation, communication, and/or control of the vehicle. Such fail-safe hydraulic and electrical on-board energy systems of a conventional type generally comprise plural, redundant, independent energy sources such as electrical generators or hydraulic pumps that are arranged on or connected to each of the engines of the vehicle, as well as a distribution system primarily including an alternating current (AC) bus and hydraulic network into which the power is respectively provided by the generators and pumps. Various particular system configurations of the above-mentioned electrical and hydraulic on-board energy systems are known, and will now be described in connection with FIGS. 1, 2, and 3, which are simplified schematic circuit diagrams.

FIG. 1 shows a schematic circuit diagram of one conventional system of the above-described type, which is typically used as an on-board energy system in a vehicle such as an air-craft having four engines (1A', 1B', 1C' and 1D'). Each one of the engines has connected or integrated therein an integrated drive generator or IDG (2A', 2B', 2C' and 2D') including a respective three-phase AC generator and an integrated constant speed drive train or transmission. In normal operation, the generators (1A', 1B', 1C' and 1D') generate and provide electrical energy into the respective AC bus bars (3A', 3B', 3C' and 3D') connected thereto. In the event of a failure of one or more of these engines (1A', 1B', 1C' and 1D') or one or more of the integrated drive generators (2A', 2B', 2C' and 2D'), the only available corrective course of action is to disconnect or isolate the inoperative generator (2A', 2B', 2C' and 2D') from the respective effected AC bus (3A', 3B', 3C' and 3D') by means of a bus disconnect switch (4A', 4B', 4C' and 4D') respectively interposed between the generators and the bus bars.

The generator-supplied main bus bars (3A', 3B', 3C' and 3D') are connected together by means of a further one or more cross-connect bus (5') that is connected to each of the main buses (3A', 3B', 3C' and 3D') by a respective disconnect switch (5A', 5B', 5C' and 5D'). In this manner, in the event of an engine failure or generator failure, the essential electrical power consuming devices can be cross-supplied with electrical power through any one of the still-functioning AC buses (3A', 3B', 3C' and 3D') via the corresponding respective disconnect switches (5A', 5B', 5C' and 5D') and the cross-connect bus (5').

Moreover, such known on-board energy systems conventionally include at least one device that operates as an emergency power generator. Such devices typically include a constant speed motor generator (CSMG) (6) that converts hydraulic energy to electrical energy, which is then provided into an AC bus for supplying electrical energy to the especially critical or essential power consuming devices. In the system shown in FIG. 1, a ram air turbine (RAT) (7'), or available hydraulic power on the hydraulic system (10B), drives the constant speed motor generator (6'), which produces electrical energy and provides this energy to the critical or essential AC bus (AC ESS) (3E'). More generally, the primary energy for driving the CSMG emergency power generator is hydraulic power that can be extracted from any one of the three hydraulic systems (10A', 10B', and 10C') of the overall power system. This hydraulic power is provided into the three hydraulic systems by the engine driven hydraulic pumps (9A', 9B', 9C' and 9D') or the ram air turbine (7'). The generation of electrical emergency power by the emergency generator is definitively triggered by a multiple system failure, for example a failure of all generators connected to the engines, various combination failures of engines and generators, a temporary failure of all four engines, or the like. In order to provide a further source or route for providing emergency power in the event of such individual failures, the system includes an additional redundancy or safety bus (5F') that is connectable to at least two of the AC buses (3B' and 3C') through a multi-path switch (8'), so that emergency power may be provided from the critical or essential bus (3E') to the two buses (3B' and 3C') or vice versa in an emergency situation.

As mentioned above, the hydraulic on-board energy system of the vehicle includes three independent hydraulic systems (10A', 10B' and 10C'), among which two of these systems (10A' and 10C') are each primarily or exclusively hydraulically pressurized by one respective hydraulic pump (9A' and 9D') connected to and driven by the respective engines (1A' and 1D'). Generally, these pumps (9A' and 9D') are constant pressure regulated pumps. The third hydraulic system or circuit (10B') is hydraulically pressurized by two pumps (9B' and 9C') respectively connected to and driven by the two engines (1B' and 1C'). In order to be able to make due with a minimum of hydraulic energy in the emergency situation of a multiple failure of engines and/or engine-driven hydraulic pumps, a hydraulic pump connected to or incorporated in the ram air turbine (7') provides hydraulic energy to at least one of the independent hydraulic circuits (10A', 10B', 10C') as generally represented by the connection of hydraulic circuit (10B') to the pump of the ram air turbine (7').

Further connected to each independent hydraulic system (10A'10B' and 10C') are respective pressure regulated hydraulic pumps (11A', 11B', 11C' and 11D'), which are respectively driven by a corresponding electric motor, typically an asynchronous AC motor, which in turn is electrically powered from one of the electrical buses. Generally, these additional electric motor driven hydraulic pumps (11A', 11B', 11C' and 11D') serve to provide hydraulic power to the hydraulic system when the engine-driven hydraulic pumps or even the engines themselves, individually or altogether, are not operating, for example when the air-craft is parked, or especially also during maintenance work and test operations. However, with appropriate circuit interconnections, these additional hydraulic pumps also serve to boost the available hydraulic power in normal operation of the vehicle during periods of high hydraulic power demands, or to provide hydraulic power to the respective circuit in the event of failure of the corresponding respective engine-driven hydraulic pump. This situation is very relevant in practice especially for two of the independent hydraulic systems (10A' and 10C') which are only equipped with or powered by a single respective engine-driven hydraulic pump.

Moreover, a hydraulic power transfer unit PTU (121') can be connected to the hydraulic systems, and particularly interconnected between two of the respective hydraulic systems. Such a hydraulic power transfer unit can be used in addition to or as an alternative to the above discussed installed additional electric motor driven hydraulic pumps (11A', 11B' and 11C'). Such a power transfer unit serves for the bi-directional cross-supplying of hydraulic power from one of the independent hydraulic systems having a power surplus to another one of the independent hydraulic systems having an insufficient power supply, for example at a lower pressure or at a lower supply flow rate, or for an increased power requirement.

Finally in the schematic circuit of FIG. 1, respective transformer-rectifier units (TRU 1' and TRU 2') serve to transform and rectify the respective AC power provided by the two engine-driven AC generators separately to the respective AC buses (3A' and 3D'). Thus, the individual transformer rectifier units (TRU 1' and TRU 2') respectively and independently provide DC power onto two DC buses (DC bus 1' and DC bus 2').

Two further typical on-board energy systems relate or apply to a vehicle having two engines, which will respectively be described in connection with FIGS. 2 and 3. In each case, each of the two engines of the vehicle has connected thereto an integrated drive generator including an AC generator and an integrated constant rotational speed drive train. The integrated drive generators respectively provide electrical energy to corresponding AC buses in the normal operation condition. The two systems of this type that will be described in the following each respectively have three independent hydraulic circuits or systems, but only have two engines and two AC buses, in comparison to the above system configuration having four engines and four AC buses. Furthermore, both of the following systems comprise essentially the same components in the way of hydraulic pumps, engine-driven generators, ram air turbine driven hydraulic pumps, emergency power generators, etc., while these various components are simply interconnected in different circuit arrangements in the two following systems in order to supply respective power to the three independent hydraulic systems and the two AC buses as well as the safety or essential AC power bus.

In view of the above, FIG. 2 shows a known system in which each of the two engines (1A" and 1B") respectively drives two hydraulic constant pressure regulated primary pumps (9A" and 9B"; 9C" and 9D") as well as a main generator (2A" and 2B"). Furthermore, the hydraulic systems respectively comprise an electric motor driven constant pressure pump (11A", 11B" and 11C") for providing hydraulic power while on the ground (i.e. while the engines of the air-craft are not operating), as well as at least one pump driven by a ram air turbine (7") for providing emergency hydraulic power. Two AC buses (3A" and 3B") are respectively connected to and supplied with power from the engine driven generators (2A" and 2B"), and a cross-connect bus (5") is selectively connectable between the two main buses (3A" and 3B") by means of a disconnect switch (5A"), in order to cross-connect electrical power from one of the main buses to the other in the event of failure of one of the main generators.

The AC power available on the AC buses (3A" and 3B") is further converted and rectified by two transformer rectifier units (TRU 1" and TRU 2") into DC power that is provided to two DC buses (3C" and 3D"). A further AC safety or essential bus (3E") is provided to supply AC power to the critical or essential devices in an emergency situation, from either one of the AC buses (3A" and 3B") through a multi-path switch (8"). In the event that both of the main generators (2A" and 2B") fail, the emergency or safety bus (3E") is provided with power from an emergency power generator CSMG (6"), which produces the electrical power using hydraulic power from the main or central hydraulic system (10B"). In the event of a complete engine failure or a combination failure of one of the engine-driven hydraulic pumps and the other or second engine, then an emergency hydraulic pump coupled to a ram air turbine (7") can provide emergency hydraulic power to the central hydraulic system (10B") and therewith also generate emergency electrical power through the CSMG (6").

FIG. 3 schematically shows a third and final variant of a known system for a vehicle having two engines (1A''' and 1B'''), which has a system architecture generally similar to that of FIG. 2. The essential differences in comparison to FIG. 2 are that each engine only drives one hydraulic pump (9A''' and 9B'''), whereby each of these two pumps is connected to a respective independent hydraulic system (10B''' and 10C'''). Moreover, an electric motor driven hydraulic pump (11A''') provides primary hydraulic power to a third hydraulic system (10A'''), also in normal operation. In order to provide emergency power, the third hydraulic system (10A''') is connected to a ram air turbine driven hydraulic pump (7'''), which provides emergency hydraulic power to a further hydraulic motor (6''') that is also connected to the third hydraulic circuit (10A''') and is further mechanically connected to an emergency power generator, which in turn provides emergency electrical power to the emergency AC power bus AC ESS (3E''') which provides power to the critical or essential electrical components. Furthermore, similarly to the above arrangement of FIG. 2, a hydraulic power transfer unit (121''') is connected between the two hydraulic circuits (10B''' and 10C''') to selectively transfer hydraulic power in either one of two directions between the two independent hydraulic systems (10B''' and 10C'''). This hydraulic power transfer unit may, for example, replace an electric motor driven hydraulic pump in the hydraulic circuit, as described above with reference to FIG. 1.

However, the present configuration may further include an electric motor driven hydraulic pump (11B''') to provide hydraulic power boost or the like.

As a general summary, it is noted that all three of the above described variants of a hydraulic and electrical on-board energy system of a vehicle each include the redundant systems or devices that will now be generally discussed, and that serve the same functions and purposes in the various alternative systems but are merely arranged and interconnected in different configurations relative to the individual hydraulic circuits and electrical buses in the three different alternative systems. In this context, plural pressure regulated hydraulic pumps driven by electric motors are used for producing the necessary hydraulic power for normal ground operation or alternative operation of the vehicle such as an air-craft. In individual cases, these hydraulic pumps can also be connected to the hydraulic circuit to act as primary pumps in normal operation or as an alternative. Thereby, electrical energy is converted into mechanical energy to drive a shaft or other mechanical drive train, by which the mono-functional hydraulic pumps are driven. In other words, energy is uni-directionally converted from electrical energy to mechanical energy and further to hydraulic energy. Further, these on-board energy systems include a mono-functional emergency power generator which produces emergency electrical energy using the available hydraulic energy from at least one of the hydraulic systems in the event of a failure of the primary electrical generators. Moreover, each one of the engines considered in the system configuration carries or incorporates at least one AC generator and one hydraulic pump, and the system configuration according to FIG. 2 even includes two hydraulic pumps for each engine. In this manner, the reliability and safety of the system is improved, not only by the redundancy of the available engines, but also by the redundant number of primary hydraulic and electrical energy sources, namely pumps and generators, whereby the individual availability and accessibility of the primary energy sources is also improved. In view of the above, the known system configuration necessarily include a relatively high number of partial functional systems, in order to achieve a high power supply reliability of both the hydraulic energy system and the electrical energy system, and in order to ensure safety of the installed on-board energy system by providing a constantly available source of hydraulic energy and source of electrical energy.

For the above reasons, the complexity, effort and cost of installation of such systems in vehicles like air-craft is disadvantageously high, and simultaneously the total vehicle weight and the operating costs for the vehicle with all its systems, including fuel costs, maintenance costs, and repair costs, are also disadvantageously increased. Finally, it is noted that none of the above described known systems make use of a bi-directional conversion and cross-connection of the hydraulic and electrical energy systems.

SUMMARY OF THE INVENTION

In view of the above it is an object of the invention to embody a power conversion system of the general type discussed above in such a manner that it can carry out all the above described functions of such a power conversion system, while requiring fewer components and partial systems yet achieving the same or a higher level of safety and reliability of the hydraulic and electrical on-board power systems in a vehicle, as compared to the prior art. It is a further object of the invention that the total installed power generation output of the overall system can be reduced by providing the capability of using bi-directional conversion and cross-connection between hydraulic energy and electrical energy into the respective energy system requiring additional energy at any particular time. Moreover, the power conversion system according to the invention aims to achieve a need-controlled power management of the hydraulic and electrical on-board energy in the vehicle such as an air-craft, while the integration of this system in the on-board energy system of the vehicle leads to a reduction in the production, installation and operation costs of the on-board energy system and further achieves a reduction in the total weight of the vehicle.

The above objects have been achieved in a power conversion system according to the invention, for bi-directionally converting the power between an on-board hydraulic energy system and an on-board electrical energy system. The on-board hydraulic system includes a hydraulic circuit or network, at least one hydraulic power source such as a hydraulic pump, and at least one hydraulic power consuming device, respectively connected to the hydraulic network. The electrical system includes an electrical distribution system such as a power bus, at least one electrical power source such as a generator, and at least one electrical power consuming device, respectively connected to the electrical distribution system.

The power conversion system according to the invention especially comprises a hydraulic partial system or circuit and an electrical partial system or circuit, between which a bi-directional power transfer is to be achieved. The electrical partial system is coupled to the electrical distribution system of the vehicle, while the hydraulic partial system is coupled to the hydraulic line system or network of the vehicle. The electrical partial system comprises an electrical conversion machine, and the hydraulic partial system comprises a hydraulic conversion machine, which are respectively mechanically rotationally coupled together by a drive shaft or drive train. Each partial system further comprises a respective switching element, namely an electrical switching element in the electrical system and a hydraulic switching element in the hydraulic system. A control unit detects the respective operating condition of each partial system and accordingly switches or sets a respective one or both of the switching elements in order to activate one of the two bi-directional conversion functions of the partial systems. Namely, if inadequate electrical power is available on the electrical distribution system of the vehicle, and an excess of hydraulic power is available on the hydraulic distribution system of the vehicle, in consideration of the relative importance or priority of power consuming devices connected to the two energy distribution systems, then excess hydraulic power is converted to electrical power and fed into the electrical distribution system. The opposite conversion operation of excess electrical power to needed hydraulic power is carried out in a similar manner.

BRIEF DESCRIPTION OF THE DRAWINGS

In order that the invention may be clearly understood, it will now be described by way of example with reference to the drawings, wherein:

FIG. 5 shows a circuit arrangement similar to that of

FIG. 4A, but particularly in a bi-directional hydraulic-electric power conversion system using high quality or high effectiveness rotational speed regulation of the hydraulic motor, whereby the electrical regulation may be simplified;

FIG. 6 is a simplified schematic diagram showing the bi-directional power conversion system according to either FIG. 4A or FIG. 5;

DETAILED DESCRIPTION OF PREFERRED EXAMPLE EMBODIMENTS AND OF THE BEST MODE OF THE INVENTION

Figure 1:
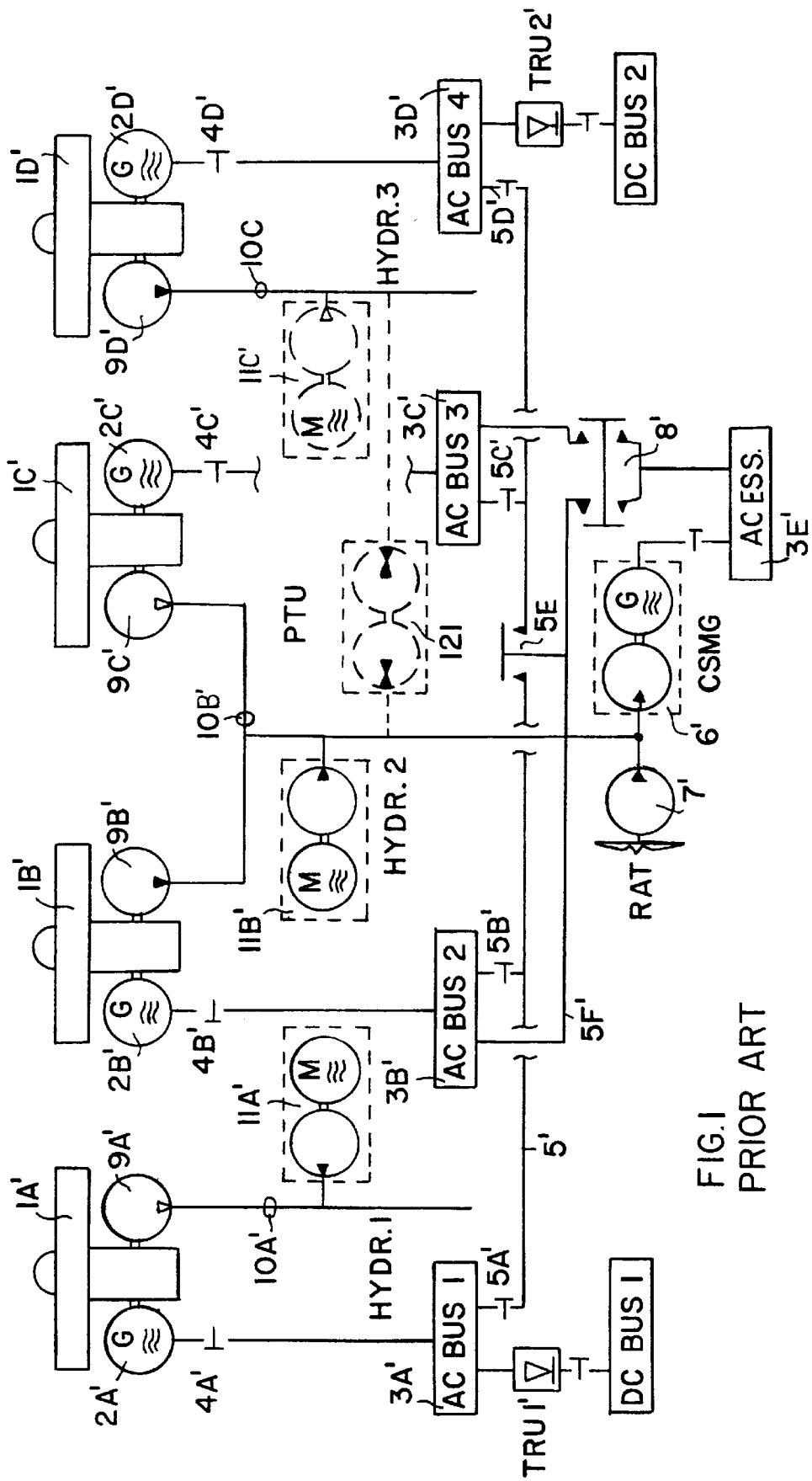
FIG. 1 is a schematic diagram of a typical first embodiment of a conventional hydraulic and electrical energy generation and supply system in a transport air-craft having four engines.
Figure 2:
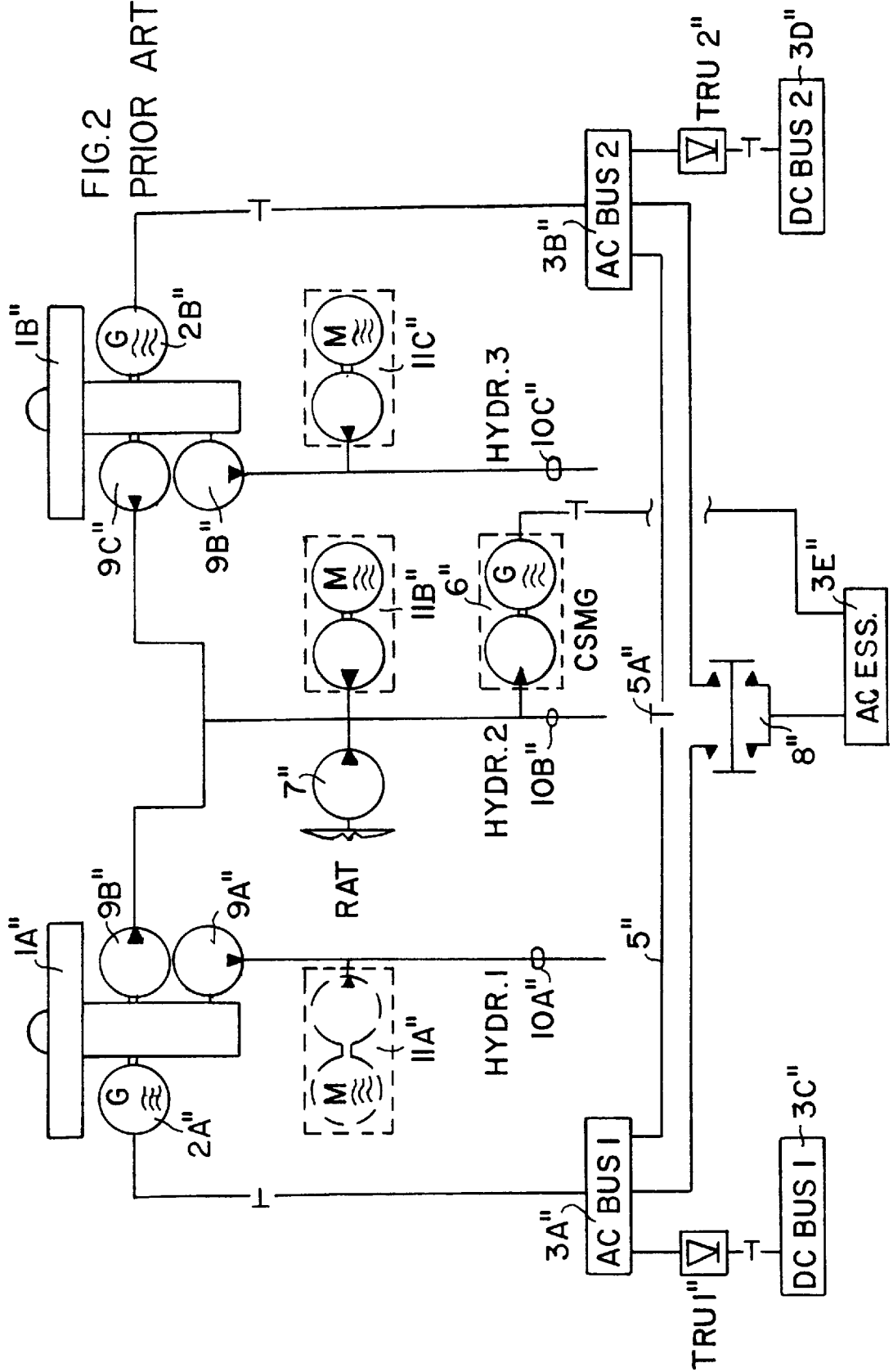
FIG. 2 is schematic diagram showing a typical second embodiment of a hydraulic and electrical energy generation and supply system in a transport air-craft having two engines.
Figure 3:
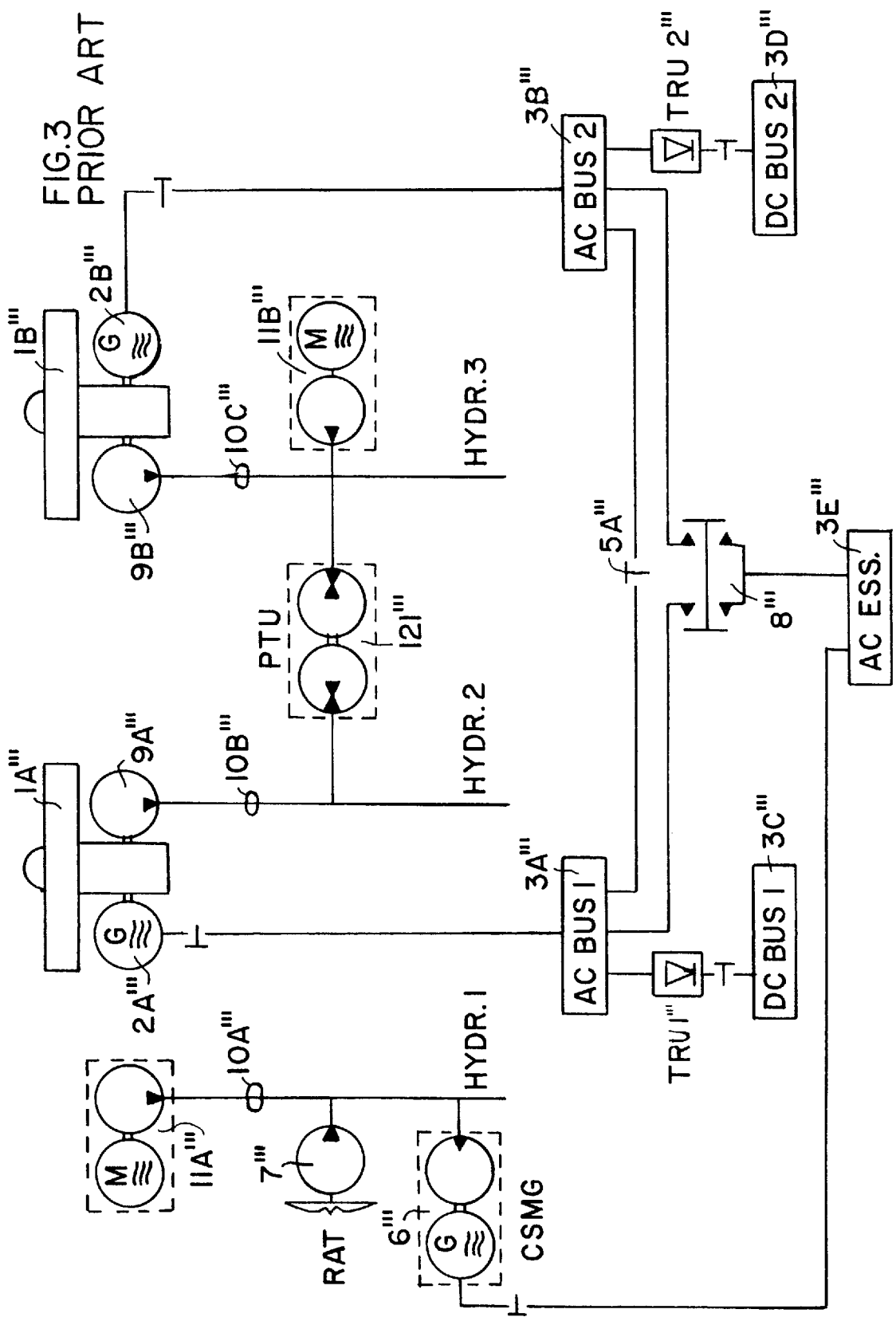
FIG. 3 is a schematic circuit diagram showing a third conventional embodiment of a typical hydraulic and electrical energy generation and supply system in a transport air-craft having two engines.

It is generally known to provide electrical and hydraulic emergency and alternative energy sources in the electrical and hydraulic energy or power systems on-board air-craft. Presently, such energy sources are embodied as plural or redundantly installed, mono-functional uni-directional energy converters such as pumps and generators. In this context, electrically driven hydraulic pumps and hydraulically driven emergency generators are used, namely are integrated into the known system configurations as described above with reference to FIGS. 1 to 3. More specifically, FIG. 1 shows a typical hydraulic and electrical energy generation and distribution system of an air-craft having four engines, while FIGS. 2 and 3 respectively show such systems in an air-craft having two engines. In comparison to such systems, the present invention provides various improved configurations and embodiments using a bi-directional power conversion system, as will be described below, whereby the previously criticized disadvantages and shortcomings of the prior art systems can be avoided or overcome. For a detailed discussion of the prior art arrangements, the above description of FIGS. 1 to 3 should be consulted, and will not be repeated here. It may further be noted, however, that certain reference numbers bearing prime marks, e.g. 1A' designating an engine in FIGS. 1 to 3, are used consistently without prime marks to represent similar components, e.g. reference number 1 designating a turbine jet engine, in the inventive configurations discussed in the following in connection with FIGS. 4 to 8C. More specifically, the structural arrangement and the functioning of the bi-directional power conversion system according to the invention will now be described in connection with FIGS. 4 to 8C.

Figure 4:
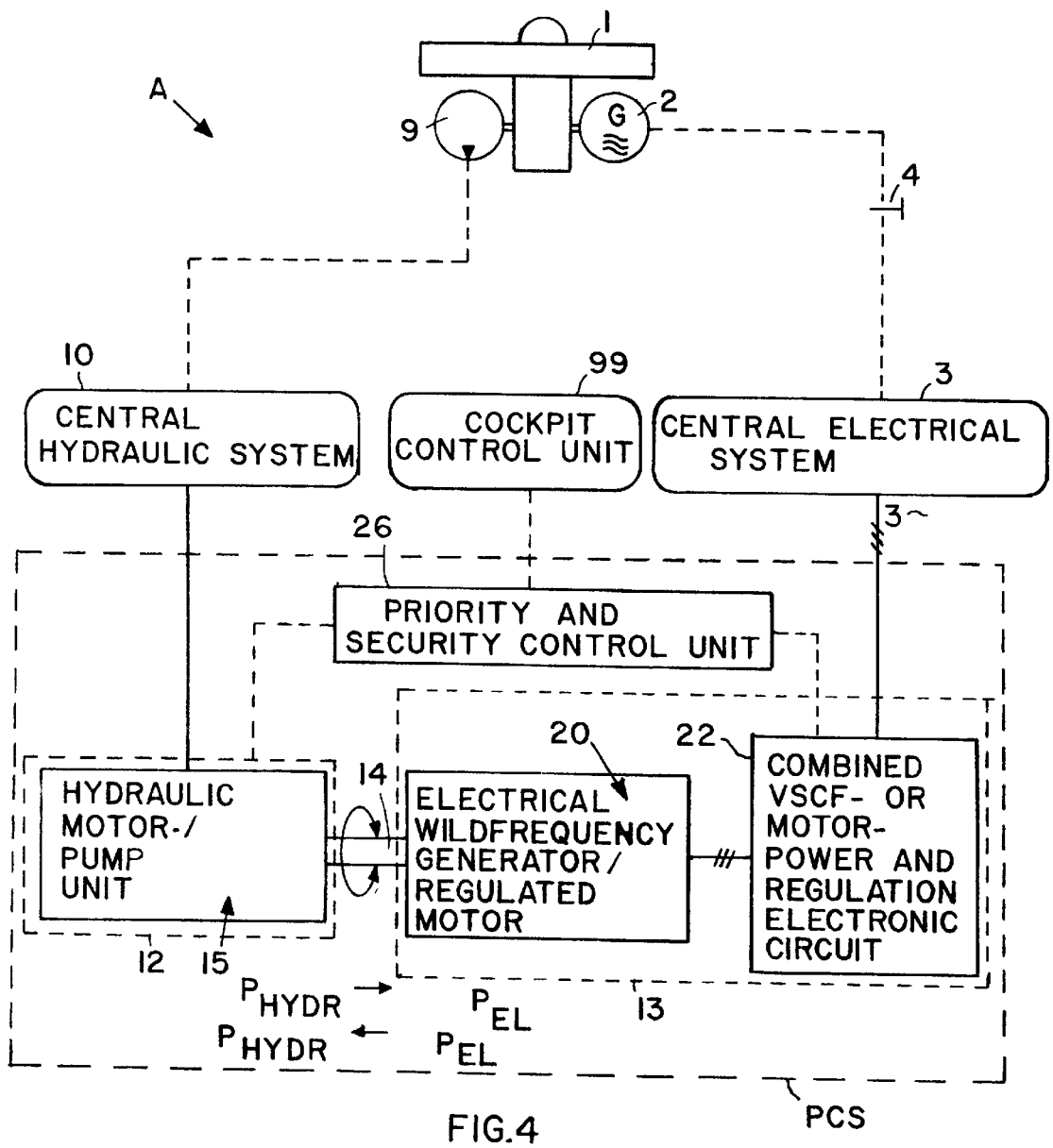
FIG. 4 is a general or overview schematic block circuit diagram of a power conversion system for bi-directional conversion between hydraulic and electrical energy, according to the invention, shown connected to the power systems and the cockpit controls of a vehicle.

FIG. 4 shows a simplified block circuit diagram giving a general overview of the power conversion system for the bi-directional conversion of hydraulic power to electrical power and vice versa, according to the invention. As an example, the present power conversion system PCS is installed in an air-craft A having an electrical system 3 and a hydraulic system 10, and primary sources for generating or providing the two different energy types, i.e. electrical energy and hydraulic energy, that are separately to be introduced into the respective electrical and hydraulic systems. Namely, the air-craft A has an engine 1, with a hydraulic source 9 and an electrical source 2 connected to and driven by the engine 1. The hydraulic source 9, for example, comprises an engine driven main hydraulic pump that sucks hydraulic fluid out of a storage tank or a return flow system, and pressurizes and pumps the fluid into the hydraulic supply lines of the hydraulic conduit system 10 of the vehicle. The electrical source 2 for example comprises a three-phase AC generator which is connected to the electrical distribution system 3 of the vehicle through a disconnect switch 4. The hydraulic conduit system 10 comprises an interconnected network or circuit of pipes or conduits or other hydraulic lines to form a central hydraulic network, while the electrical distribution 3 comprises an electrical interconnection of plural electrical buses to form a central electrical bus network. It should be understood that the two engine driven main energy sources 2 and 9 shown here in an exemplary manner can also be provided in a plural or redundant manner in connection with plural engines 1 of the vehicle, or may be distributed over several of such engines.

Most generally, the present power conversion system PCS includes a hydraulic partial system 12 and an electrical partial system 13, which are mechanically and preferably rotationally connected to one another by a drive shaft 14 or a gear train or other mechanical drive transmission, and are respectively connected to the corresponding power systems of the air-craft. The power conversion system further generally includes a control unit 26 especially in the form of a priority and safety switching unit, which is connected to the hydraulic partial system 12 and to the electrical partial system 13 for respectively controlling the operation thereof.

The hydraulic partial system 12 essentially comprises a hydraulic motor/pump unit 15, which may be a hydraulic displacement machine 15 for example, which includes a rotationally supported machine element that is provided to be mechanically coupled to the shaft or the like 14. The primary component of the electrical partial system 13 is an electrical synchronous machine 20, which includes a generator/motor such as an electrical wild frequency generator that also functions as a regulated motor 20, having a rotationally supported machine element that may be connected to the shaft 14. The electrical partial system 13 further includes a so-called variable speed constant frequency (VSCF) motor power control electronic circuit, embodied as an electronic control unit 22, which is electrically connected to the electrical machine 20. The respective rotatably supported machine elements of the hydraulic and electrical machines 15 and 20 are mechanically and rotatably coupled together by the shaft 14 or other mechanical drive train in such a manner, with such matched rotational speeds, that the operating efficiencies or power conversion operating rates of the two partial systems 12 and 13 are optimized and tuned to one another as needed for the respective nominal operating power conditions.

Figure 4A:
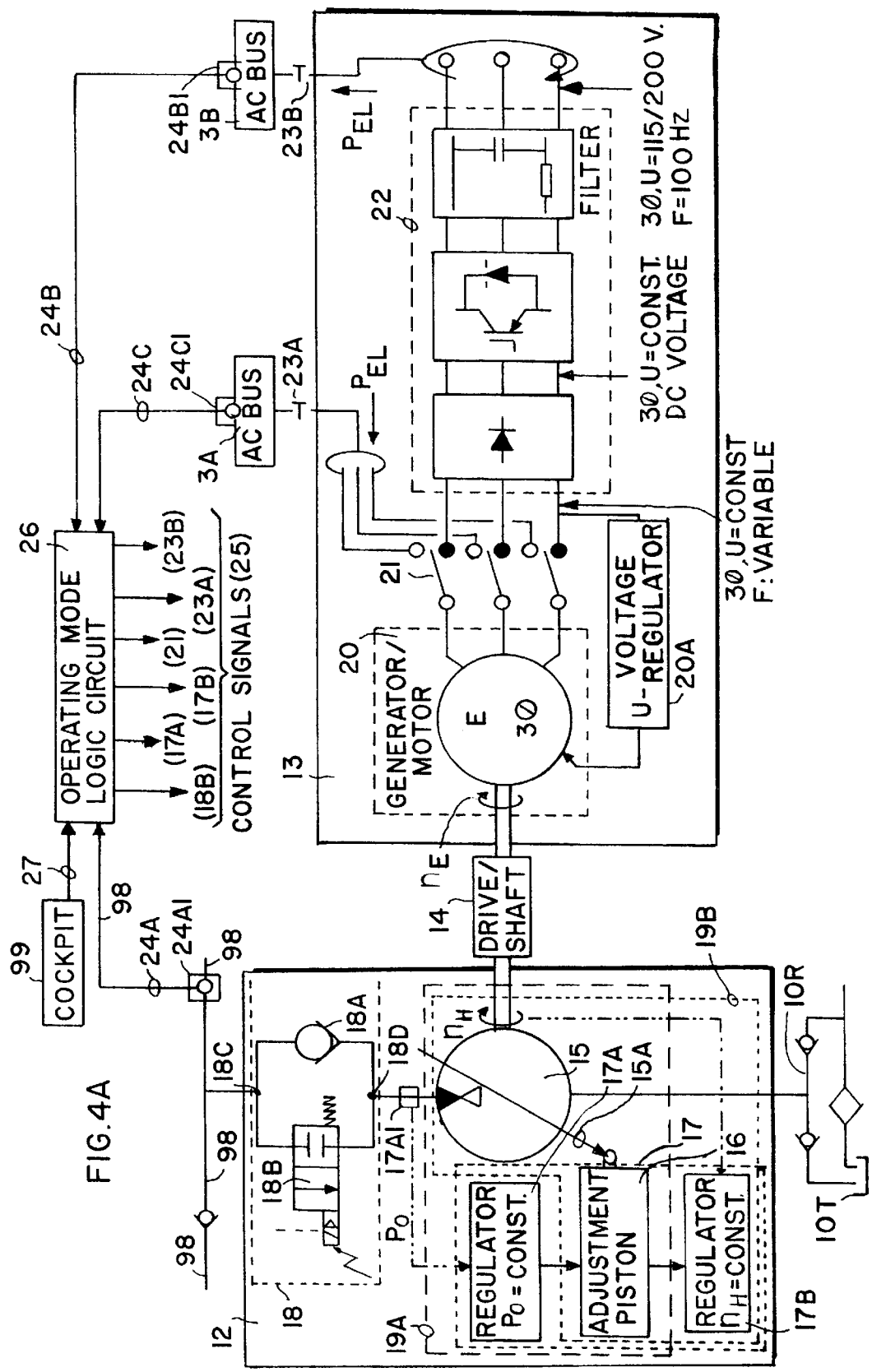
FIG. 4A is a more detailed schematic diagram showing the bi-directional hydraulic-electrical power conversion system of FIG. 4.

Further specific details of the construction of the hydraulic and electrical partial systems 12 and 13, and the functioning of the elements integrated therein, will be discussed in further detail below with regard to FIG. 4A. However, additional general aspects of the system will now be described still with reference to FIG. 4. The partial systems 12 and 13 further include mode-specific or system-specific switching elements 18 and 21, e.g. a hydraulic switching arrangement 18 and an electrical switching arrangement 21, which are shown in FIG. 4A and will be discussed in detail below. The power conversion system PCS further includes a control unit 26 cooperating with the switching arrangements for controlling and actuating the operation and power flow in the system. The control unit 26 which is electrically connected for signal transmission to the two partial systems 12 and 13, serves the function of the so-called priority and safety switching circuit, which carries out an overall monitoring of the system. Namely, the control unit 26 monitors the two partial systems 12 and 13 and appropriately actuates and controls the hydraulic or the electrical partial system 12 or 13, or more specifically the hydraulic or the electrical machine 15 or 20, through the corresponding switching arrangements 18 and 21, responsive to and based on the detected actual operating condition respectively of the hydraulic conduit system 10 or the electrical distribution system 3, and in view of the respective priority allocated to the power consuming devices demanding electrical or hydraulic power from the respective power systems at any given time. By means of the actuation and control carried out by the control unit 26, the switching elements 18 and 21 respectively integrated into the two partial systems 12 and 13 are appropriately set or switched, so that one of the two possible bi-directional conversion functions of the system is activated.

Responsive to and depending upon the above-mentioned operating status or condition, the control unit 26 controls the operating mode of the two partial systems 12 and 13 to carry out a conversion from hydraulic energy to electrical energy, or vice versa, by converting the received excess type of energy into rotational mechanical energy and applying this mechanical energy to the drive transmission or shaft 14 by means of one of the partial systems 12 and 13, and then receiving the rotational mechanical energy from the transmission or shaft 14 and converting it into the respective required type of energy in the other one of the two partial systems 12 and 13, so as to provide the needed type of energy into either the hydraulic on-board power system or the electrical on-board power system of a vehicle. For example, the electrical machine 20 operating as a regulated motor, is driven by excess electrical energy from the central electrical bus network 3, to in turn drive the shaft 14 and the hydraulic machine 14, which transfers hydraulic energy in the form of pumped hydraulic fluid into the hydraulic conduit system or network 10 that is connected to the hydraulic partial system 12 by means of conduits or the like. On the other hand, for example, available hydraulic energy from the hydraulic network 10 can be used to drive the hydraulic machine 15 operating as a hydraulic motor, which in turn transfers the energy from the rotating shaft 14 to the electrical machine 20 operating as a generator to convert the rotational mechanical energy of the shaft 14 into electrical energy. The output of the electrical machine 20 is connected to the electronic unit 22, which functionally operates as a combined variable speed constant frequency motor power and regulation electronic control unit, which further processes the electrical energy output by the generator 20. This further processed electrical energy is then transferred to the electrical distribution system 3 of the vehicle.

FIG. 4 further shows a general schematic block indicating a centralized electronic control input and monitoring unit 99, such as an input keyboard and a display monitor screen, arranged in the cockpit of the vehicle. This cockpit mounted control unit is connected via an automatic circuit to the control unit 26 in order to transmit control signals therebetween, for example over electrical conductors. An operating mode logic circuit of the control unit 26, in addition to the above-mentioned automatic circuit, appropriately activates the power conversion system PCS in a selected mode of the two available bi-directional modes in the event of a detected pressure drop in the hydraulic system 10 of the vehicle or a voltage drop in the central electrical system 3 of the vehicle. Through the connection with the cockpit mounted control unit 99, the operating mode control unit 26 can further activate the operation of the power conversion system PCS in accordance with input commands entered by the pilot or some other operator of the system into the cockpit mounted control unit 99, for example in order to carry out test operations and/or to switch off or override the automatic operation of the operating mode logic circuit of the control unit 26.

FIG. 4A shows a particular example embodiment of the present power conversion system for use in an air-craft for example, in greater detail. As already described above, the present embodiment of FIG. 4A includes a hydraulic machine 15 that can operate as a hydraulic pump or as a hydraulic motor, and an electrical machine 20 that can operate as a generator or a motor, coupled together by a rotatable shaft 14. Thus, the conversion operation from hydraulic energy to electrical energy or vice versa is carried out generally as described above.

In the specific embodiment of FIG. 4A, the hydraulic partial system 12 essentially comprises a hydraulic machine 15 such as a hydraulic pump/motor 15 in the form of an adjustable hydraulic displacement machine, preferably an axial piston machine with an adjustable angled disk 15A, of which the stroke volume can be adjusted by means of an adjustment device 16 such as an adjustment piston 16 or an electro-mechanical adjusting device, as well as electrical, electronic, or hydro-mechanical regulation units or controllers 17A and 17B connected to be effective on the adjustment device 16, and the hydraulic switching arrangement 18 connected by conduits to the hydraulic displacement machine 15.

The hydraulic switching arrangement 18 is embodied as, and carries out the function of, a valve assembly, which for example comprises two valves 18A and 18B connected together in parallel by appropriate conduits or channels. More specifically, the first valve 18A is a non-return or check valve, while the second valve 18B is a selectable multi-position blocking valve or shut-off valve. The input sides of the two valves 18A and 18B are fluid-flow connected to a first input branch point 18C that forms the inlet of the hydraulic partial system 12 that is connected to a hydraulic conduit 98 of the hydraulic system 10 of the air-craft, while the outlet or output sides of the two valves 18A and 18B are connected for fluid flow to a second branch point 18D, which in turn is hydraulically connected to the hydraulic displacement machine 15. It should be understood that the terms "inlet" and "outlet" are used only as a convenient reference, but that fluid may flow in both directions through the valve assembly.

In the present embodiment, the first valve 18A is not electrically activated as it may be in another embodiment, but rather is a passive spring-biased non-return valve, that is biased by a spring into a passive base position preventing fluid flow from the hydraulic system 10 to the hydraulic machine 15, and only opening under the influence of hydraulic pressure to allow fluid flow from the hydraulic machine 15 to the hydraulic system 10. In this manner, the non-return valve 18A prevents hydraulic power from being removed from the hydraulic system 10 through the valve 18A, but allows hydraulic power to be provided back into the hydraulic system 10 through the valve 18A when the hydraulic machine 15 is operated in a hydraulic pump mode. The non-return valve 18A cooperates with the actuatable control valve 18B as follows.

The control valve 18B is normally in a closed or shut-off position preventing fluid flow in both directions. When the valve 18B is actuated, for example by an electrical signal powering an electro-mechanical actuator to open the valve against a spring bias force, the valve 18B opens to allow fluid flow therethrough from the hydraulic system 10 to the hydraulic machine 15 to activate the hydraulic motor operating mode of the hydraulic machine 15. In this manner, with such a valve setting, hydraulic power can be removed from the hydraulic system 10 to drive the hydraulic motor 15 and thus provide mechanical power through the shaft 14 into the electrical partial system 13 as will be described below. The same functions carried out by the two valves 18A and 18B can also be carried out by a single, differently embodied valve, such as a so-called non-return/free flow valve. In such a single valve, the non-return function of the first valve 18A would be incorporated into the closed position of the second valve 18B.

The hydraulic partial system 12 operates either as a pressure regulated pump using the components enclosed within a first dashed line 19A, or as a rotational speed controlled or secondary controlled hydraulic motor using the components enclosed within the second dashed line 19B. Namely, the pressure regulated pump involves the hydraulic machine as a pump 15, in connection with a first controller 17A that operates as a constant pressure controller, and the adjustment device 16, while the hydraulic motor operation involves the hydraulic machine operating as a motor 15 in connection with a second controller 17B that operates as a constant rotational speed controller, and the adjustment device 16. The two controllers 17A and 17B are separately or independently connected for control signal transmission to the adjustment device 16. Furthermore, the first controller 17A is connected to at least one pressure sensor 17A1 that is integrated into a conduit connection between the outlet junction 18D of the valve arrangement 18 and the hydraulic displacement machine 15, or alternatively the sensor may be incorporated in the first controller 17A. Similarly, the second controller 17B is connected to a rotational speed sensor 17B1 which is arranged to sensitively detect and measure the rotational speed of the shaft 14. These two controllers 17A and 17B can be embodied in any manner known in the art, for example electrically, electro-mechanically, or hydro-mechanically, to correspondingly use electrical signals and operation, electro-mechanical signals and operation, or hydraulic signals and operation.

When the hydraulic displacement machine 15 is operating in the pump mode, the first controller 17A operates as a pressure controller which sensitively detects the output pressure $p_o$ of the pump 15 and appropriately regulates the operation of the pump 15 via the adjustment device 16 based on the respective output pressure $p_o$, for example to achieve a constant output pressure matched to the nominal pressure of the hydraulic system 10. In this pump operating mode, the hydraulic fluid being provided under pressure by the pump 15 flows through the non-return valve 18A into the hydraulic system 10, while the second valve 18B remains closed. The hydraulic fluid is sucked by the pump 15 from a return line system 10R and/or a reservoir tank 10T of the hydraulic system 10. On the other hand, when the hydraulic displacement machine 15 is operating in the hydraulic motor mode, the second controller 17B operates as a rotational speed controller or regulator, which sensitively detects the rotational speed $n_H$ of the hydraulic motor 15 and appropriately regulates the operation of the motor 15 via the adjustment device 16 to achieve a constant rotational speed. This motor operating mode is achieved by activating the second valve 18B to the through-flow or open valve position so that hydraulic fluid will flow from the high pressure conduit 98 to the hydraulic motor 15, which is thus driven thereby, whereafter the fluid flows back through the return line 10R to the tank 10T.

The second controller 17B can be a hydro-mechanical controller or regulator, which mechanically senses and reacts according to the rotational speed $n_H$. Alternatively, the second controller 17B may be an electro-hydraulic controller using an electrical sensor for measuring the rotational speed $n_H$. These two controllers 17A and 17B are correlated with or through the valve assembly 18 and particularly the second valve 18B, and are further selectively operably or switchably connected to the hydraulic displacement machine 15. The first controller 17A can be a hydro-mechanical or an electronic controller using an electro-hydraulic adjustment mechanism, that is respectively effective on the adjustment device 16 for the angled disk 15A of the controllable hydraulic machine 15.

In the embodiment in which the first controller 17A comprises an electronic controller, two special circuit arrangements or operating modes are possible. In the first special circuit operation of the electronic controller 17A, a start-up phase of the pump is carried out in order to run-up the pump of the bi-directional power conversion system from a standstill to a normal operating speed in the fastest, load-free manner. To achieve such a start-up phase the operating mode logic circuit of the control unit 26 provides the appropriate control signals, and the angled disk 15A of the adjustable pump 15 is maintained at a zero or null stroke setting to allow a load-free operation until the pump 15 substantially reaches a synchronous rotational speed of the electrical machine 20 of the electrical partial system 13. Only then does the first controller 17A control the operation of the pump 15 so as to achieve and maintain the desired constant pressure $p_o$.

The second special operating mode of such an electronic controller 17A relates to an operation based on a prescribed nominal pressure or control pressure. The desired or nominal pressure may either have a constant value corresponding to the nominal pressure $p_o$ of the output of the engine driven main hydraulic pumps 9A to 9D shown in FIGS. 8A to 8C, or may be a variable or adjustable pressure as will be described below. The constant value, prescribed nominal pressure thus corresponds to the so-called flat cut-off characteristic of the hydraulic pumps 9A to 9D, and is prescribed in the first controller 17A via the operating mode logic circuit of the control unit 26 when the bi-directional power conversion system is to be operated as a supplementary or boosting hydraulic pump for better supporting peak hydraulic power requirements, while simultaneously operating the primary hydraulic pumps 9A to 9D in parallel therewith. As mentioned above, the prescribed nominal pressure $p_o$ can alternatively have a variable value that is adjusted dependent upon the pump output volume flow, corresponding to the so-called soft cut-off characteristic of pressure regulated pumps. Such a soft cut-off prescribed nominal pressure is set in the first controller 17A via the operating logic circuit of control unit 26 preferably in such situations when the bi-directional power conversion system is to be used as the sole source or as a replacement source of hydraulic power for the hydraulic system, when the primary pumps 9A to 9D have failed or are otherwise unavailable, and if the maximum motor power required to achieve this shall be more sharply or strongly limited.

The electrical partial system 13 as shown in FIG. 4A essentially comprises the electrical machine 20, the second operation specific switching arrangement 21, and the electronic unit 22. The electrical machine 20 is, for example embodied as an AC synchronous machine which operates either as an electrical motor or an electrical generator in the system. The second operation specific switching arrangement 21 is a multi-pole electrical pole reversing switching arrangement, whereby the contacts or connections of the electronically or electrically controllable devices of the synchronous machine and of the multi-pole electrical pole reversing switching device or arrangement 21 are connected to a voltage regulator. The electronic unit 22 is a generally known power electronics control and processing unit comprising, in order, and connected electrically in series, a rectifier, a DC/AC converter or inverter, and a filter, each having respective output stages. The three-phase AC contacts of the synchronous machine are connected to the corresponding contacts, namely the base or root contacts of the switching member, of the pole reversal switching device 21. The main input contacts of the rectifier are connected to one of the switch selectable AC contacts of the multi-pole switching member of the pole reversal switching arrangement 21.

The other AC contacts of the pole reversal switching arrangement 21, which has at least two switching positions, are electrically connected to the conductor contacts of an AC power connection, which in turn is electrically connected through a disconnect switch 23A to a first AC bus 3A. In a similar manner, the main output contacts of the filter output stage of the power electronics unit 22 are connected to a second AC interconnection, which in turn is connected through a second disconnect switch 23B to a second AC bus 3B. It is alternatively possible to provide a single electrical bus instead of the two independent buses 3A and 3B, in which case it is further possible to replace the two disconnect switches 23A and 23B by a single disconnect switch.

As a further variant embodiment in the construction and functioning of the power electronics unit 22, it may be desirable to provide appropriate switching stages to reverse the series arrangement of the rectifier and the D(/AC converter, in order to achieve a controlled or regulated start-up phase of the electrical machine 20 in the operating mode when it is to be driven as a motor using electrical power from the power system 3. Namely, in such a case the rectifier stage would have to be powered, i.e. connected at its input to the electrical power system 3, while the output of the rectifier would be provided to the DC/AC converter, from which the output would be connected to the electrical machine 20.

It should further be understood within the scope of the invention that the electrical machine 20 and/or the on-board electrical power system 3 are not necessarily embodied for three-phase AC power. Instead, it is also possible to use any other desired known electrical machine 20, for example a single-phase machine, that can be operated as either a motor or a generator.

In the event that the electrical machine 20 and the on-board electrical power system 3 are not tuned or matched to one another, then the power electronics unit 22 must be switched to operate as a control and commutation electronic circuit for driving the electrical machine 20 operating as a motor, whereby the power electronics unit 22 would be switched essentially in a reverse direction, so to speak, in comparison to the above described operation for a controlled start-up phase of the motor. As a further alternative, for a relatively low power electrical machine 20, it is also possible to operate the electrical machine 20 connected directed to a single-phase or multi-phase AC voltage power net, without using the otherwise bi-directionally operating power electronics unit 22. Moreover, the system can be operated on a DC voltage power net, whereby the DC/AC converter is bypassed by means of appropriate switches, while the system is operating in the generator mode. In any event, the DC/AC converter is required for carrying out electronic commutation while the electrical machine 20 is operating in a motor mode, whereby it is understood that the DC/AC converter can be completely eliminated or avoided if a mechanical commutator is used.

By means of the pole reversal switching arrangement 21, the electrical machine 20 may be switched to operate either as a motor or as an AC generator, in two modes as follows. When the switching element of the pole reversal switching arrangement 21 is switched into a first or upper switching position in the view schematically shown in FIG. 4A, then AC power flows from the on-board electrical system 3 of the air-craft, namely from the first AC bus 3A through the first disconnect switch 23A through the pole reversal switching arrangement 21 to the AC synchronous electrical machine 20, which thus operates as a motor using the available electrical power from the on-board electrical system 3.

On the other hand, if the switching element of the pole reversal switching arrangement 21 is switched to the second or lower switching position in the view shown in FIG. 4A, then the output contacts of the electrical machine 20 operating as an AC generator will be connected to the power electronics unit 22 and from there through the second disconnect switch 23B to the second AC power bus 3B of the electrical system 3 of the air-craft. In this operating mode, the electrical machine 20 operates as an AC generator having a constant effective voltage U and a constant frequency f, if the drive transmission or shaft 14 is driven by the hydraulic machine 15 operating as a hydraulic motor, and the rotating shaft 14 in turn drives the electrical machine 20 as a generator. This second operating mode, namely the generator operating mode, and the associated switching condition of the pole reversal switching arrangement 21, generally corresponds to the known functional principle of an electrical system for generating a constant voltage and constant frequency output while having a variable or oscillating input drive rotational speed $n_E$, i.e. a variable speed constant frequency (VSCF) electrical generation principle. In this switching condition, the multi-poled pole reversal switching arrangement 21 closes a circuit or contact with the respective individual pole switching elements between the AC contacts that are connected to the main input contacts of the rectifier, and the separate respective root or base contacts.

FIG. 4A further shows a voltage regulator 20A connected between the electrical machine 20 and the input of the power electronics unit 22, which can be any known voltage regulator for achieving the voltage regulated operation of the electrical machine 20 in the manner discussed above. In the present example embodiment, the output of the electrical machine 20 operating as a generator is a three-phase AC electrical current having a constant voltage, but a variable frequency, which is rectified to provide at the output of the rectifier a three-phase rectified current having a constant voltage level, which is then further processed through the DC/AC converter and filter stages to provide a final output of a three-phase AC current having a voltage of 115/200 V and a frequency of 400 Hz that is further to be provided into the air-craft electrical system 3.

The hydraulic partial system 12 and the electrical partial system 13 are mechanically connected together through the drive transmission or the shaft 14, which preferably has an adjustable transmission ratio such that the hydraulic motor rotational speed $n_H$ of the hydraulic machine 15 can be matched, i.e. stepped up or stepped down, as necessary relative to the drive rotational speed $n_E$ of the electrical machine 20, in order to provide operation with the best possible partial efficiencies within the two partial systems 12 and 13, namely within the two machines 15 and 20, while operating at the nominal power level. In order to achieve this, the drive transmission or shaft 14 may comprise any known mechanical power transmission arrangement, including switchable gear drives, constantly variable transmissions, and the like.

The operating mode control of the bi-directional power conversion system PCS is achieved by the above-mentioned operating mode logic circuit, which may be an electrical or electronic logic circuit, integrated into the control unit 26. A sensitive pressure sensor 24A1 arranged in the hydraulic system 10 of the air-craft is connected to the control unit 26 via a dataline 24A which thus provides pressure dependent sensor signals to the control unit, while respective electrical sensors 24C1, 24B1 arranged to sense the electrical status of the two AC buses 3A and 3B are connected to the control unit 26 via datalines 24C and 24B which thus provide voltage dependent sensor signals to the control unit. Furthermore, the above-mentioned cockpit control and input unit 99 is connected to the control unit 26 via a dataline 27. The operating mode logic circuit within the control unit 26 evaluates and processes the various input signals, and responsively provides logical switching signals 25 that are provided to appropriately control the hydraulic valve arrangement 18 and the electrical pole reversal switching arrangement 21 of the two partial systems 12 and 13 in order to activate either an electrical motor and hydraulic pump operating mode or a hydraulic motor and electrical generator operating mode.

The operating mode logic circuit advantageously may comprise an automatic circuit (not shown), which automatically activates the bi-directional power conversion system in the proper operating mode upon the occurrence of a pressure drop in the hydraulic system 10 of the air-craft or a voltage drop on the power buses 3A or 3B of the electrical system 3 of the air-craft. As described above, pilot-entered input signals or other data provided by the cockpit unit 99 are received and evaluated by the operating mode logic circuit through the conductor 27, for example to carry out a test operation of the system or to override or switch off the operating mode activated by the automatic circuit. Moreover, it may advantageously be provided that various measured signals for monitoring the operation of the hydraulic partial system and the electrical partial system are evaluated in the operating mode logic circuit in order to ensure that the respective system is functioning correctly. In the event that the measured parameters deviate from allowable system values, i.e. reach unacceptable system values, then the automatic circuit is switched off, an error condition is indicated, for example on the pilot control unit 99, and the entire system is switched off or placed into suspended operation.

With the above-described structural arrangement and operation of the bi-directional power conversion system shown in FIG. 4A, it is possible to operate the system in two modes. In the first generator operating mode, hydraulic energy is converted into electrical energy, which is supplied into the second power bus 3B, in the event that the primary electrical source such as the primary generators that ordinarily provide power to the power bus 3B either have failed or provide an inadequate amount of power to supply the power demand, i.e. the power being consumed by all of the power consuming devices connected to the respective power bus. Alternatively, the power conversion system can be operated in a second operating mode, wherein electrical energy taken from an intact operational electrical power bus 3A is converted into hydraulic energy in the form of pumped hydraulic fluid that is delivered into the hydraulic system 10. The bi-directional power conversion system is constantly connected to a prescribed on-board hydraulic system, in a controlled manner through the valve assembly 18, while one or more of various power buses 3A and 3B, for example may selectively be connected to the electrical side of the power conversion system according to the respective requirements or application at hand, through the electrical disconnect switches 23A and 23B.

FIG. 5 shows a further varied embodiment of the bi-directional power conversion system. In FIG. 5, the electrical partial system 13 does not include a power electronics unit 22, in contrast to the embodiment shown in FIGS. 4 and 4A, wherein such an electronics unit 22 is used for producing a stable output frequency even in the event of a fluctuating or oscillating rotational speed of the shaft 14. Thus, the present embodiment of the power conversion system is advantageous in situations in which the rotational speed of the hydraulic machine 15, and especially of the shaft 14, can be regulated with sufficient precision or accuracy even in the event of strongly varying loads, in order to provide the necessary accuracy and constancy of the output frequency of the output electrical power being generated. In other words, in situations in which the rotational speed of the generator 20 can be regulated to a constant nominal value through appropriately controlling the speed of the shaft 14, then electrical frequency regulation is not necessary. All other components and characteristics of the embodiment described in connection with FIG. 4A also apply to the present embodiment according to FIG. 5.

FIG. 6 is a simplified schematic view of a particular bi-directional power conversion system 40, of which the individual features were shown and described in detail in connection with FIGS. 4A and 5. The present simplified schematic of the particular architecture of the system is being used for describing additional embodiments relating to various on-board power system configurations. The electronic power regulation unit 22 is optional if the hydraulic machine 15 operating as a hydraulic motor in the generator mode of the system is regulated with sufficient precision and constancy to meet the needs for a sufficiently exact constant and stable output frequency of the electrical machine 20 operating as a generator.

Figure 7A:
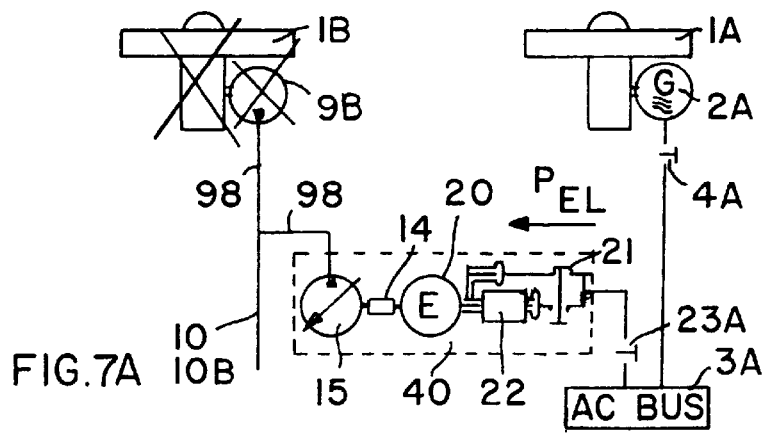
FIG. 7A shows the general bi-directional power conversion system in the electro-pump operating mode.
Figure 7B:
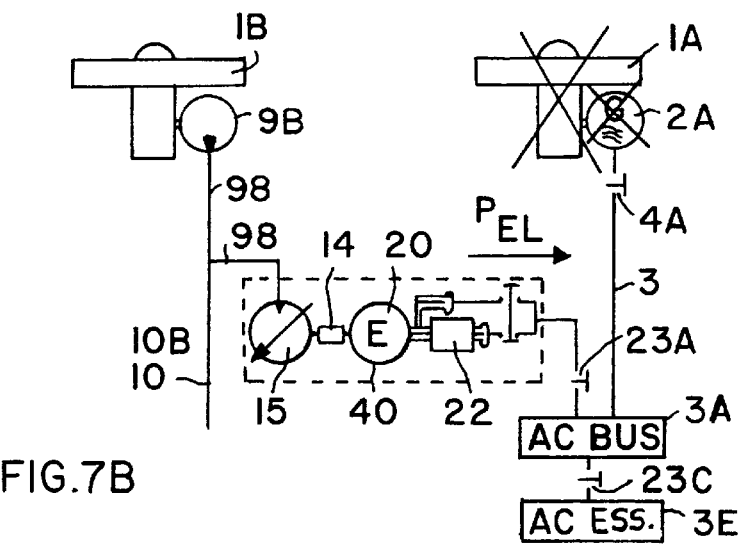
FIG. 7B shows the bi-directional power conversion system, for example according to FIG. 7A, but operating in the alternative or emergency generator mode.

FIGS. 7A and 7B show two different operations or operating modes of the presently defined bi-directional power conversion system 40, which may be selectively activated as needed, depending on the operating status of the hydraulic system 10 and the electrical system 3 of an air-craft having two engines 1A and 1B, whereby a primary generator 2A connected to and driven by the engine 1A provides primary electrical power into the electrical system 3, while a primary hydraulic pump 9B is connected to and driven by the engine 1B to pressurize hydraulic fluid into a hydraulic conduit 98 of the hydraulic system 10.

FIG. 7A shows the situation in which the engine 1B and thus also the engine-driven hydraulic pump 9B has failed, or is switched off while the air-craft is parked or operating on the ground. In this situation, the power conversion system 40 will convert available electrical power into hydraulic power in order to provide the necessary hydraulic power in the hydraulic system 10. The present power conversion system 40 thus replaces the mono-functional electrically driven hydraulic pumps of known prior art arrangements, for example the pumps of the independent systems 11A, 11B and 11C as shown and described with reference to FIGS. 1 to 3 above. FIG. 7B shows the situation in which the engine 1A and thus also the generator 2A connected thereto have failed, or been switched off while the air-craft is parked or operating on the ground. In this situation, available hydraulic power will be converted into electrical power and fed into the AC power bus 3A and especially the critical or essential components AC power bus 3E in order to provide the required electrical power in the electrical system 3. The operating arrangement depicted in FIG. 7B is also for providing auxiliary or supplemental electrical power to help cover the peak electrical power demands that might be inadequately satisfied by the primary generator 2A. Thus, it can be seen that the present bi-directional power conversion system 40 replaces the mono-functional hydraulically driven constant speed motor generators or emergency power generators 6 as shown and described above with reference to FIGS. 1 to 3. The two operating situations shown in FIGS. 7A and 7B will now each be described in detail.

In the configuration or switching condition of the bi-directional power conversion system 40 as shown in FIG. 7A, the following electrical connections exist between the various components. The first engine driven AC generator 2A, which is one of the primary electrical power sources, is electrically connected through the first disconnect switch 4A to the AC power bus 3A, which in turn is electrically connected through an appropriate AC conductor and a disconnect 23A to the electrical switching arrangement 21 incorporated in the bi-directional power conversion system 40. The switching arrangement 21 is switched to bypass the power electronics unit 22, so that AC electrical power is directly provided from the AC bus 3A to the electrical machine 20 through the switching arrangement 21, whereby the electrical machine 20 operates as an electrical motor to drive the rotational shaft 14. The hydraulic machine 15, which now operates as a hydraulic pump 15, has its output connected to a pressure line 98 so that pressurized hydraulic fluid and thus hydraulic power can be transferred into the hydraulic system 10 in the event of the failure of the engine driven hydraulic pump 9B or even the entire engine 1B, or in the event of a deficiency in the hydraulic power provided by the hydraulic pump 9B.

The circuit arrangement shown in FIG. 7B further includes the AC power bus AC ESS 3E that provides emergency electrical power in a limited manner to those electrical devices that are critical or essential for operation of the air-craft. The essential or critical power bus 3E is connected to the above-mentioned usual AC power bus 3A by a conductor line with an interposed disconnect switch 23C. In the situation and switching condition shown in FIG. 7B, hydraulic power is provided by the engine driven primary hydraulic pump 9B into the pressurized conduits 98 of the hydraulic system 10. The hydraulic machine 15 operating as a hydraulic motor 15 extracts hydraulic energy from the hydraulic pressurized conduits 98 for driving the hydraulic motor 15 which in turn drives the rotary shaft 14. The shaft then drives the electrical machine 20, now operating as a generator 20, such that the hydraulic power is converted to electrical power, which flows through the electrical switching element 21, to be further processed through the power electronics unit 22 and ultimately provided to the AC power bus 3A and further to the critical or essential AC power bus 3E. This illustrated situation assumes that the primary electrical power generator 2A or the entire engine 1A has failed or is not operating.

Figure 7C:
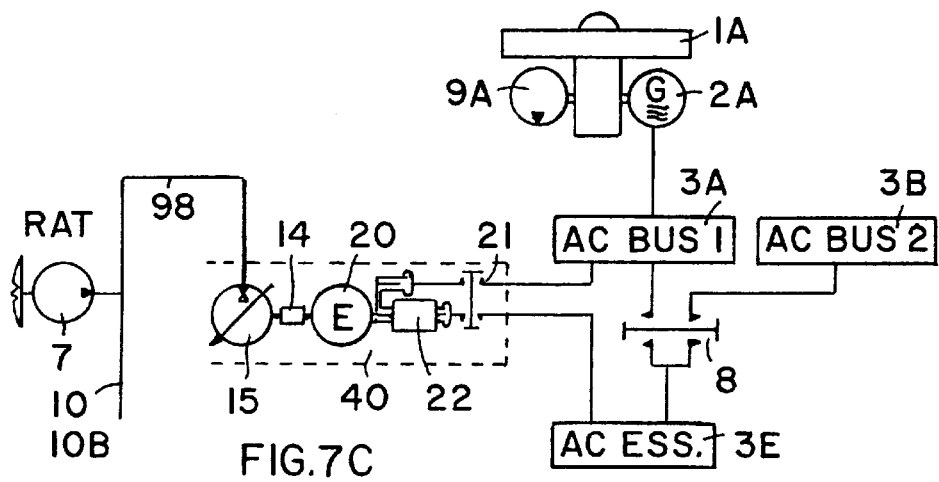
FIG. 7C shows the bi-directional power conversion system operating in a hydraulic system to primarily provide the hydraulic power, while a ram air turbine provides additional hydraulic power.

The use of the defined bi-directional power conversion system 40 as described above in connection with FIG. 6 instead of a mono-functional electrically driven hydraulic pump (as in the conventional independent hydraulic system 11A of FIGS. 1 to 3) and a mono-functional hydraulically driven conventional constant speed motor/generator (operating as an emergency generator device 6 in FIGS. 1 to 3) is also applicable to hydraulic systems using a further auxiliary or supplemental ram air turbine driving a hydraulic pump 7 as shown in FIG. 7C. As discussed above, such hydraulic systems are primarily provided with hydraulic power in the form of pressurized hydraulic fluid from an engine driven hydraulic pump such as pumps 9A to 9D of above FIGS. 1 to 3, while the ram air turbine with its connected hydraulic pump 7 forms an alternative, auxiliary, or emergency energy source. In the conventional arrangement, the emergency hydraulic power provided by the ram air turbine and pump 7 is converted into electrical energy by the constant speed motor generator (CSMG) device 6. By replacing such a CSMG device 6 with the bi-directional power conversion system 40 according to the invention, the advantage is achieved that the power conversion system 40 can selectively operate as the primary hydraulic pump or as an emergency generator depending upon the selected operating mode.

The circuit arrangement of FIG. 7C shows that the hydraulic machine 15 of the defined power conversion system 40 is connected to a pressure line 98, which in turn is connected to the hydraulic pump 7 that is mechanically connected to and driven by the ram air turbine. The electrical switching element 21 is separately connected to the first AC bus 3A, and through the power electronics unit 22 to the critical or essential AC bus 3E. An electrical multi-path switch 8, which is shown as a single pole switch having four electrical contacts, is interposed between and among the first AC bus 3A, the essential or critical bus 3E, and a second AC bus 3B. Two contacts of the switch 8 are connected together by a conductor bridge, which in turn is connected to the critical or essential bus 3E. The other two contacts of the switch 8 are separately or independently connected respectively to the first AC bus 3A and the second AC bus 3B. Thus, by appropriately switching the multi-path switch 8, the critical or essential bus 3E may selectively be coupled with the first AC bus 3A or the second AC bus 3B or neither bus 3A or 3B. The first AC bus 3A is further electrically connected to the primary generator 2A that is driven by the engine 1A.

In the event that the primary hydraulic pump 9A driven by the engine 1A is inoperative or provides inadequate hydraulic power, the system will operate according to any one of the following possibilities. The ram air turbine driving the hydraulic pump 7 will provide auxiliary or emergency hydraulic power into the hydraulic system 10. If the ram air turbine with pump 7 provides an adequate amount of hydraulic power to supply all the hydraulic power needs of the hydraulic system 10, and the generator 2A provides sufficient electrical power for the electrical needs in the electrical system 3, then the power conversion system 40 may be inoperative or in a standby mode. However, if the auxiliary or emergency hydraulic power provided by the ram air turbine and pump 7 is insufficient, while excess electrical power is available on the electrical power system 3, then the excess electrical power will be used to drive the electric machine 20 operating as an electric motor, which in turn rotationally drives the shaft or transmission 14 to drive the hydraulic pump 15, thereby converting electrical energy to hydraulic energy which is supplied into the hydraulic power system 10. On the other hand, if there is an excess of hydraulic power available in the hydraulic system 10, and inadequate electrical power in the electrical system 3, for example due to the failure of the generator 2A, or if the electrical devices connected to the essential AC bus 3E are receiving inadequate electrical power and have a higher priority than the hydraulic devices, then hydraulic power will be extracted from the high pressure conduit 98 to drive the hydraulic motor 15, and in turn drive the electrical generator 20 through the shaft 14 so as to provide emergency electrical power that is fed into the essential AC bus 3E and/or the first and second AC buses 3A and 3B, depending on the switching positions of the electrical switching arrangement 21 and the multi-path switch 8.

Figure 8A:
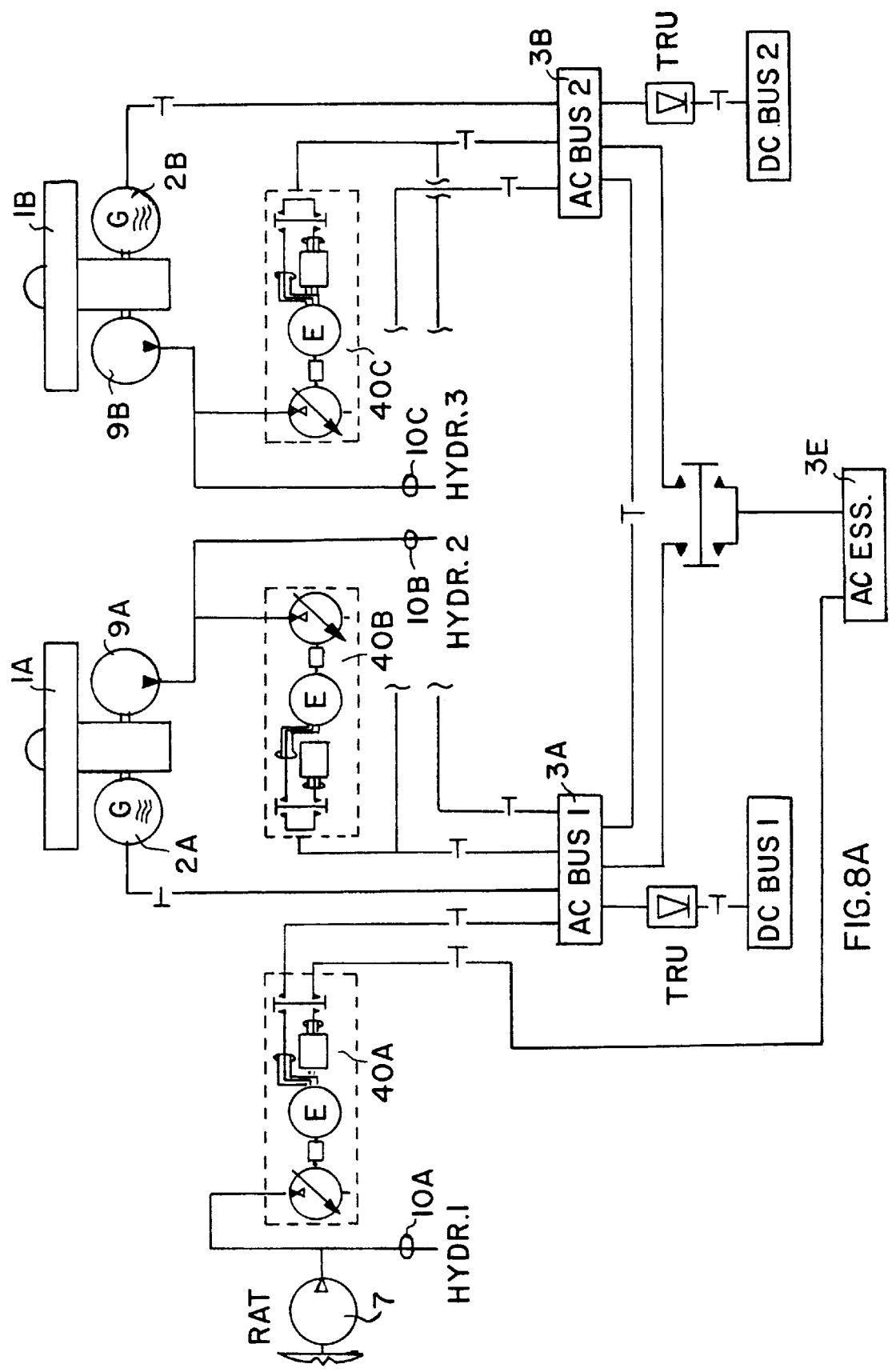
FIG. 8A is a schematic diagram showing a hydraulic and electrical energy generation and supply system generally according to the configuration of FIG. 3, but further using the bi-directional power conversion system according to the invention.
Figure 8B:
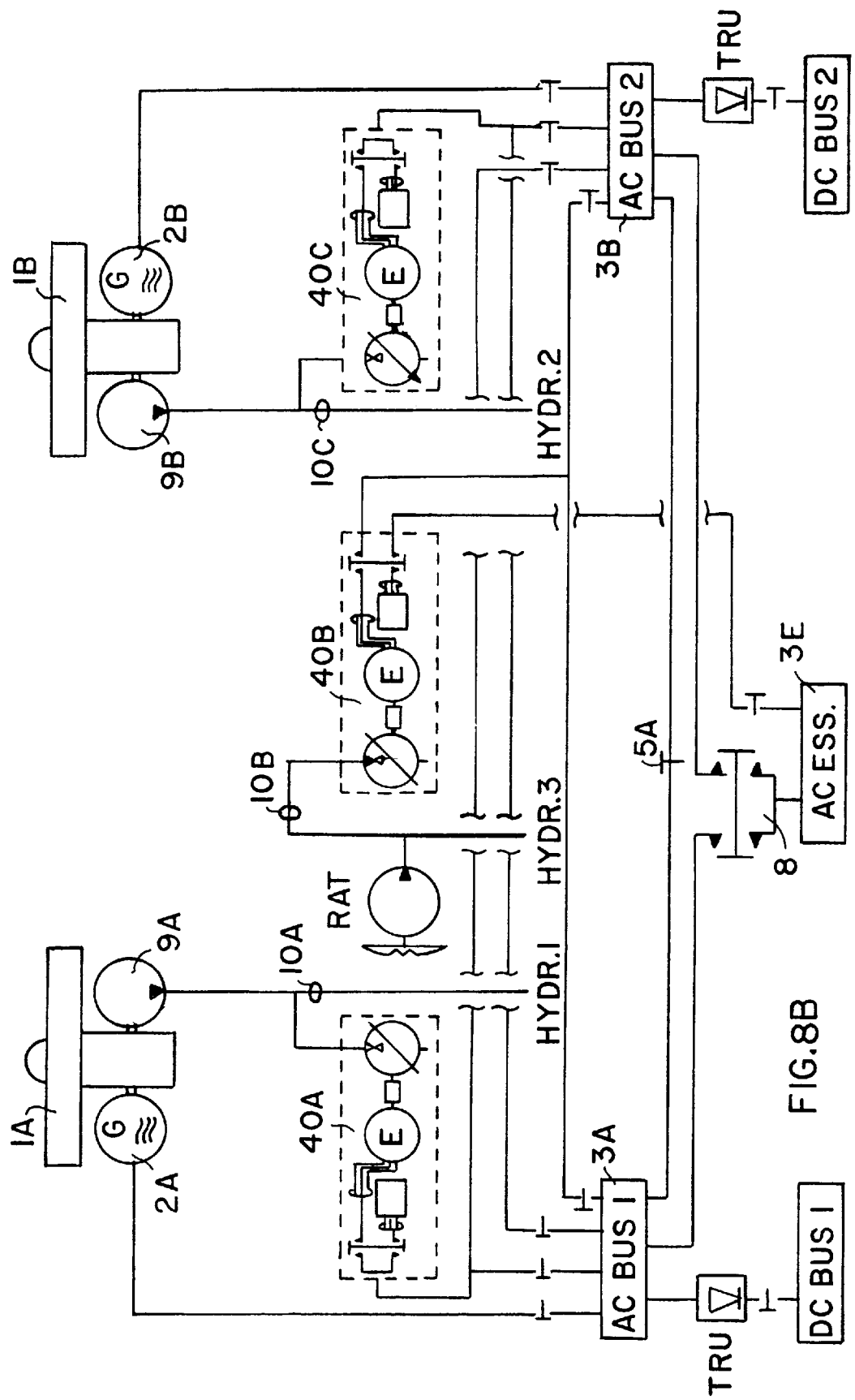
FIG. 8B is a schematic diagram showing a hydraulic and electrical energy generation and supply system generally according to the configuration of FIG. 2, but further using the bi-directional power conversion system according to the invention.
Figure 8C:
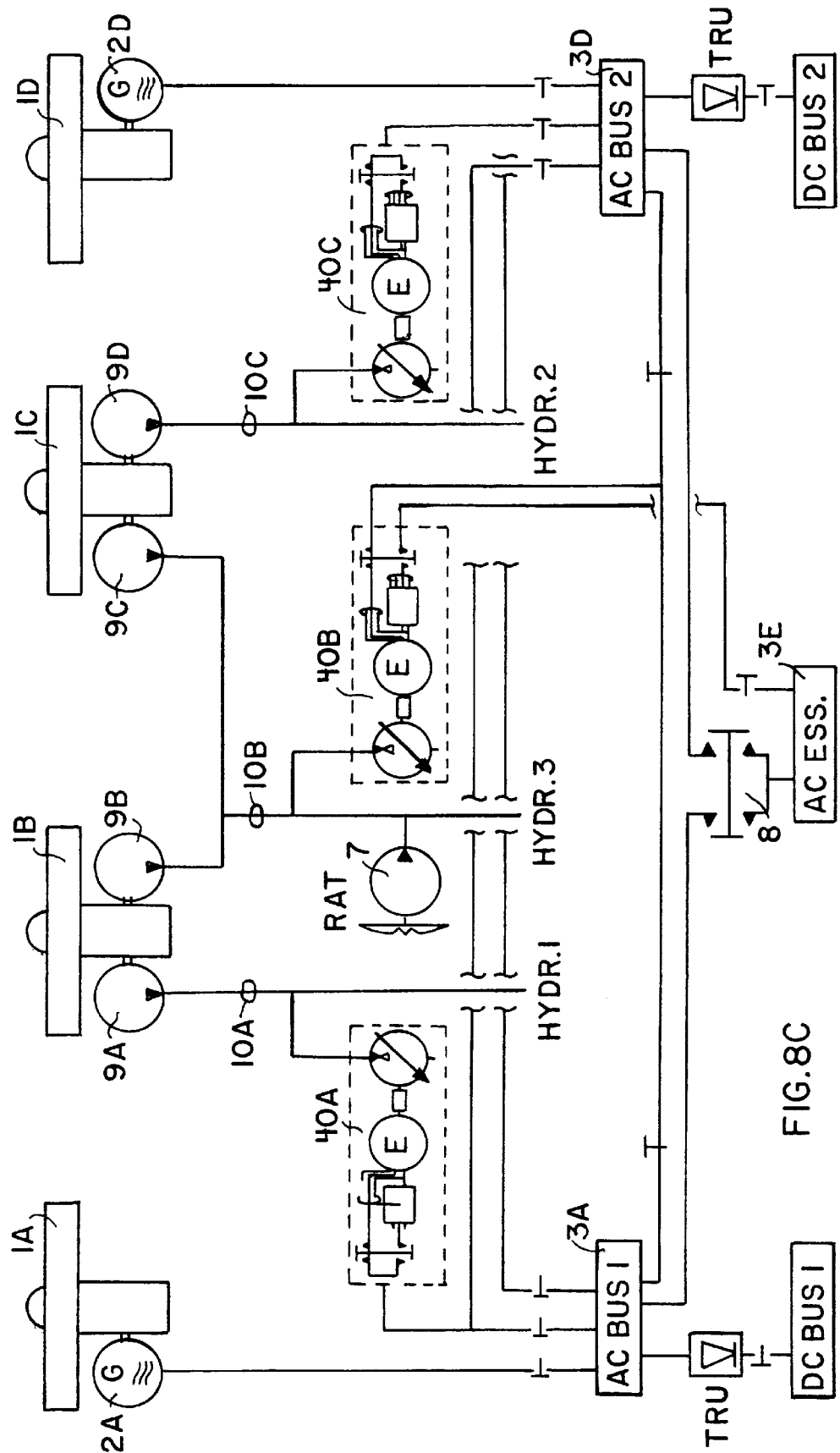
FIG. 8C is a schematic diagram showing a hydraulic and electrical energy generation and supply system generally according to the configuration of FIG. 1, but further using the bi-directional power conversion system according to the invention.

It is further illuminating of the invention to note that various combinations of the above-described basic principles of utilizing the present bi-directional power conversion system can be used depending upon the particular application at hand in multiply redundant hydraulic and electrical energy or power systems on-board vehicles of all types, and especially air-craft. Use of the present bi-direction power conversion system to replace independent mono-functional or mono-directional conversion apparatus of the prior art systems allows a greater reliability, safety and redundancy to be achieved. For example, using the present bi-directional power conversion system, each source of hydraulic power on-board the air-craft is also available as a secondary or redundant source for ultimately producing electrical power. Similarly, each primary source of electrical power on the air-craft is also available as a secondary redundant source for ultimately producing hydraulic power. Use of the present bi-directional power conversion system thereby overcomes the known disadvantages of the conventional system concepts shown in FIGS. 1 to 3. FIGS. 8A, 8B and 8C show example embodiments of different system configurations using the present power conversion apparatus instead of the known typical system configurations according to FIGS. 1 to 3.

In comparison to the arrangement of FIG. 3, the arrangement of FIG. 8 uses the present bi-directional power conversion systems 40A, 40B and 40C to replace all of the electrically driven hydraulic pumps of the conventional independent hydraulic systems 11A''', 11B''' as well as the hydraulic power transfer unit 121''' of the conventional arrangement according to FIG. 3. An advantage of the present use of the bi-directional power conversion systems 40A, 40B and 40C is that the systems simultaneously serve the function of an alternative or emergency electrical generator or power source. Thus, the overall redundancy and back-up safety of the system is improved, i.e. the likelihood of a non-correctable failure or lack of electrical power or hydraulic power is significantly reduced. A further advantage of the lo present system of FIG. 8A is that it avoids the need of using one of the conventional devices, namely the CSMG device 6''' including an integrated emergency power generator that is necessary in the conventional arrangement according to FIG. 3.

Moreover, it is possible according to invention, during flight or driving operation of the vehicle, to operate the bi-directional power conversion systems 40B and 40C in a manner so as to provide supplemental electrical or hydraulic power when necessary to meet peak demand conditions. Thus, the power conversion systems 40B and 40C can be operated as auxiliary generators providing electrical power onto the buses 3A and 3B, while extracting or utilizing available hydraulic power from the hydraulic systems 10B and 10C. On the other hand, the power conversion systems 40B and 40C can be operated as auxiliary hydraulic pumps to provide additional hydraulic power on the hydraulic systems 10B and 10C while extracting or using available electric power from the power buses 3A and 3B. Such an embodiment variation according to the invention may be advantageously used when the peak electrical power needs do not arise simultaneously with the peak hydraulic power needs in the respective power systems during normal operating conditions.

Thus, it is possible to dimension and design the primary energy sources such as hydraulic pumps 9A and 9B and electrical generators 2A and 2B to respectively provide the necessary nominal power for the normal or nominal power consumption level, with a certain safety margin, without needing to provide respective power coverage for the peak loads. In other words, the auxiliary electrical power and hydraulic power available from the respective other power system through the bi-directional power conversion units 40B and 40C can be taken into account when designing the power systems and particularly the primary power sources. The resulting advantage is that the installed power generation capacity can be reduced, thereby achieving savings in cost and weight, as long as the total power available including the auxiliary power provided through the power conversion systems is adequate to cover the total peak demands arising at any time in either power system. Alternatively, it could be considered that the inventive arrangement using the power conversion systems is able to cover or provide adequate power for higher peak load conditions than could be covered by the primary hydraulic or electrical power provided by the pumps 9A and 9B and the generators 2A and 2B. In this manner, fewer restrictions are placed on the operating possibilities of the air-craft.

FIG. 8B shows an inventive arrangement, which in comparison to the conventional arrangement of FIG. 2 replaces all of the electrically driven pumps 11A" to 11C" by the inventive bi-directional power conversion systems 40A to 40C. Moreover, in comparison to the conventional system of FIG. 2, the system of FIG. 8B uses only one primary hydraulic pump 9A and 9B per engine 1A and 1B, while each primary pump 9A and 9B has approximately twice the rated hydraulic power output of the conventional pumps, i.e. a double hydraulic flow volume. The load applied to the engines for the shaft power for driving the pumps and generators is not significantly altered. However, further advantages are achieved because all of the power conversion systems 40A to 40C can be operated either as electrically driven hydraulic pumps or as alternative or emergency power generators.

The advantages of the inventive arrangement according to FIG. 8B compared to the conventional arrangement of FIG. 2 are as follows. First, two independent hydraulic systems 10A and 10B are available, each having or providing double capacity hydraulic power, while in contrast, in the conventional arrangement of FIG. 2 only the central hydraulic system 10B" has the double hydraulic power available. Secondly, the inventive arrangement according to FIG. 8B avoids the need of installing hydraulic conduits from the central hydraulic system 10B arranged in the central landing gear bay outboard to the two engine driven pumps 9B and 9C as is necessary in the arrangement of FIG. 2, whereby the inventive arrangement reduces the total weight, cost, and complexity of the installed hydraulic system. Third, the CSMG device 6" including the emergency power generator as used in the system of FIG. 2 can be completely omitted. Fourth, the reliability of the availability of the electrical and hydraulic power is significantly improved through the use of the bi-directional power conversion systems 40A to 40C, i.e. the likelihood of a power failure on either one of the power systems is considerably reduced. Fifth, just as described above with reference to FIG. 8A, it is possible to cover the peak power demands arising on the electrical power buses or in the hydraulic power system during certain flight phases by appropriately operating the power conversion systems 40A to 40C, and it is even possible to take the additional power available through the power conversion systems into account when designing the primary power supply systems, to achieve cost and weight savings by providing a reduced total installed nominal power capacity of the primary pumps and generators.

In the arrangement shown in FIG. 8C, in comparison to that shown in FIG. 1, all the electrically driven pumps 11A' to 11C' have been replaced by bi-directional power conversion systems 40A to 40C. Moreover, in comparison to the typical conventional arrangement shown in FIG. 1 having hydraulic pumps and electrical generators mounted on four engines, in the present arrangement only one respective generator 2A and 2D having twice the normal or conventional nominal output power is respectively mounted on only two engines 1A and 1D, while two pumps 9A, 9B, 9C and 9D are respectively mounted on each one of the other two engines 1B and 1C. The total load applied to the engines through the shaft power extracted for driving the pumps and generators is not substantially different from that in the conventional arrangement of FIG. 1. However, advantages are achieved because all of the power conversion systems 40A to 40C can be operated as either electrically driven pumps or alternative or emergency generators.

The advantages of such an inventive arrangement using bi-directional power conversion systems 40A to 40C as shown in FIG. 8C, in comparison to the arrangement shown in FIG. 1 are as follows.

First, with the same available electrical and hydraulic nominal power respectively provided to the electrical power buses 3A and 3D and to the hydraulic systems 10A to 10C, the present arrangement can omit conduit connections between two pumps provided on the inner and outer engines in the conventional air-craft, as well as the electrical cable connections running from the fuselage to the two inner engines 1B and 1C for the two generators in the conventional arrangement, thereby achieving cost and weight savings. Second, the CSMG device 6' including the emergency generator as used in the arrangement of FIG. 1 can be omitted. The reliable availability of electrical and hydraulic power is considerably improved by the use of bi-directional power conversion systems 40A to 40C, i.e. the likelihood of a failure of the two types of power is considerably reduced. Fourth, as discussed above in relation to the arrangement shown in FIGS. 8A and 8B, it is possible to cover the peak power requirements arising on the power buses or in the hydraulic system of the vehicle during certain operating phases thereof by appropriately connecting and operating the power conversion systems 40A to 40C, or the additional power capacity provided through the power conversion systems 40A to 40C may be taken into account when designing the primary power supply system, to achieve weight and cost savings by reducing the total installed nominal power capacity of the primary hydraulic pumps and primary electrical generators.

Using the inventive bi-directional power conversion systems according to the invention, it is possible to achieve many different configurations of energy conversion systems between hydraulic and electrical emergency power supplies in generally any type of vehicle construction. While the present inventive arrangements are particularly suitable for use in air-craft due to the safety, reliability, and redundancy considerations, the use in air-craft is not a limitation for achieving the advantages of the invention. The present bi-directional power conversion system can effectively replace, and take over the functions of, any conventional electrically driven hydraulic pump as well as any conventional hydraulic-electrical alternative or emergency power generators, as are used in conventional air-craft construction for example.

Generally, the system comprises a hydraulic motor that can also be operated or driven as a pump, and an electrical generator/motor connected thereto via a drive train or shaft. An electrical converter unit produces an on-board voltage having a constant frequency from the three-phase AC voltage having a variable frequency produced by the generator operating in an emergency power mode. In the event that additional hydraulic power is required, this electrical converter unit or computer can be circuit connected as a converter powered from the on-board power net, to in turn power and drive the rotational speed regulated electric motor, which then drives the hydraulic pump through the shaft. In this context, the control and conversion electronics, which are especially embodied as bi-directionally functional electronics, are carried out or based on highly integrated power semiconductors. In addition to the rectifier function carried out by the control electronics in accordance with variable speed constant frequency (VSCF) technology for the generator, in order to avoid the need of hydro-mechanical regulation of the rotational speed, the power control electronics can also be used for regulating the motor operation, for example to achieve a regulated run-up of the motor in conditions when additional or emergency hydraulic power is needed.

The use of the present bi-directional power conversion system makes it possible to achieve various architectures of on-board electrical and hydraulic power systems that achieve and embody a reduction and savings on the total number of components and interconnections needed in the conventional system arrangement, while also achieving a comparable or improved reliability of the overall power supply. Moreover, in comparison to the conventional system arrangements, the present system achieves savings in weight, complexity, maintenance requirements, production costs and operating costs. Also, such bi-directional power conversion systems allow peak power loads to be managed or covered with an adequate power capacity without needing to provide nominal installed capacity of each type, i.e. electrical and hydraulic, to cover the respective hydraulic and electrical peak loads, while conventional power management concepts are either limited to the particular energy type that is being managed or require separate distinct components or systems for carrying out the power conversion in two opposite directions between two types of power.

The present bi-directional power conversion systems are effective for converting electrical energy into mechanical energy, and further converting that mechanical energy into hydraulic energy, and vice versa between the respective inputs and outputs of the power conversion system, and thus for correspondingly transferring energy or power in either selected direction from one power system to the other. Using such bi-directional power conversion systems, and any of various embodiments or arrangements thereof, it is possible to technologically integrate electrical and hydraulic emergency or alternative energy sources, which at present are realized in conventional power systems by individual or separate energy converters, e.g. electrically driven hydraulic pumps and hydraulically driven emergency generators.

It is expected in the future that the various on-board systems of modern land, water, and air vehicles will have ever higher demands for hydraulic and electrical power, especially because the present trends call for increasing the travel distances and reducing the total weight of the respective vehicles. In the context of commercial passenger and transport air-craft, and especially large air-craft such as future high capacity air-craft or multi-deck air-craft, the on-board power requirements can be expected to increase greatly because the on-board power requirements increase more than proportionally with the increase in the total size of the air-craft. Moreover, future on-board energy systems are needed, which will achieve a time-relative and energy source-relative compensation or handling of the peak power loads arising in the power supply network. These needs can be met using the present bi-directional power conversion systems integrated into a modern power management system, because in contrast the conventional systems are necessarily always designed to provide adequate respective capacity for the electrical and hydraulic peak power loads, further in consideration of the necessary redundancy.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A power conversion system for bi-directionally converting electrical power to and from hydraulic power, adapted to be connected to and between an on-board hydraulic system and an on-board electrical system of a vehicle, said power conversion system comprising:

a hydraulic machine, that can operate selectively as a hydraulic motor and as a hydraulic pump, and that has a first rotatable power input/output element and a first hydraulic port;

an electrical machine, that can operate selectively as an electrical generator and as an electrical motor, and that has a second rotatable power input/output element that is mechanically coupled to said first rotatable power input/output element;

a hydraulic switching arrangement hydraulically connected to said hydraulic machine and adapted to controllably hydraulically connect said hydraulic machine with the on-board hydraulic system, wherein said hydraulic switching arrangement has a first port adapted to be hydraulically connected to the on-board hydraulic system and a second port connected to said first hydraulic port of said hydraulic machine;

an electrical switching arrangement electrically connected to said electrical machine and adapted to controllably electrically connect said electrical machine with the on-board electrical system;

a control unit connected for signal transmission to said hydraulic switching arrangement and to said electrical switching arrangement, adapted to detect at least one control data selected from an electrical operating condition of the on-board electrical system, a hydraulic operating condition of the on-board hydraulic system, and a control selection input, and adapted to actuate and control said hydraulic switching arrangement and said electrical switching arrangement responsively to said at least one control data so as to actuate a selected one of a first operating mode in which said hydraulic machine operates as said hydraulic motor and said electrical machine operates as said electrical generator, and a second operating mode in which said electrical machine operates as said electrical motor and said hydraulic machine operates as said hydraulic pump, responsively to said at least one control data;

a hydraulic machine control and regulation unit connected to said hydraulic machine for controlling and regulating the operation thereof;

a first pressure sensor adapted to sense a system pressure in the on-board hydraulic system and connected for signal transmission to said control unit;

a second pressure sensor interposed and adapted to sense a hydraulic pressure prevailing between said second port of said hydraulic switching arrangement and said first hydraulic port of said hydraulic machine and connected for signal transmission to said hydraulic machine control and regulation unit; and a rotational speed sensor arranged and adapted to sense a rotational speed of said first rotatable power input/output element of said hydraulic machine and connected for signal transmission to said hydraulic machine control and regulation unit.

2. The power conversion system according to claim 1, further in combination with and comprising said on-board electrical system and said on-board hydraulic system, wherein said hydraulic system comprises a conduit system and at least one primary hydraulic pump connected to said conduit system, and said electrical system comprises an electrical conductor distribution system and at least one primary electrical generator connected to said electrical conductor distribution system.

3. The power conversion system according to claim 1, comprising a rotatable shaft connected and arranged to provide said mechanical coupling between said first rotatable power input/output element of said hydraulic machine and said second rotatable power input/output element of said electrical machine.

4. The power conversion system according to claim 1, comprising a mechanical drive train connected and arranged to provide said mechanical coupling between said first rotatable power input/output element of said hydraulic machine and said second rotatable power input/output element of said electrical machine, and wherein said mechanical drive train has a gear ratio adapted to match respective nominal operating rotational speeds of said hydraulic machine and said electrical machine to each other.

5. The power conversion system according to claim 1, wherein said hydraulic machine further has a second port adapted to be connected to at least one of a return conduit of the on-board hydraulic system and a suction line connected to a hydraulic reservoir tank of the on-board hydraulic system.

6. The power conversion system according to claim 1, wherein said hydraulic machine comprises an adjustable displacement machine having an adjustable stroke displacement volume that is adjustable responsively to said hydraulic machine regulation and control unit.

7. The power conversion system according to claim 6, wherein said adjustable displacement machine is an axial piston machine having an integrated adjustable angled disk.

8. The power conversion system according to claim 6, wherein said hydraulic machine control and regulation unit comprises an adjustment device that is connected for control transmission to said adjustable displacement machine, a first regulator device connected for control signal transmission to said adjustment device, and a second regulator device connected for control signal transmission to said adjustment device, wherein said second pressure sensor is connected for signal transmission to said first regulator device, and said rotational speed sensor is connected for signal transmission to said second regulator device.

9. The power conversion system according to claim 8, wherein said first regulator device is a pressure dependent regulator that is so connected and adapted to be active in said second operating mode in which said hydraulic machine operates as said hydraulic pump which is pressure regulated by said adjustment device, responsive to control signals received from said first regulator device, dependent on an output pressure of said hydraulic pump sensed by said second pressure sensor as said hydraulic pump pumps hydraulic fluid through said hydraulic switching arrangement into the on-board hydraulic system.

10. The power conversion system according to claim 9, wherein said first regulator device and said adjustment device together form at least one of a hydro-mechanical pressure regulator including an integrated adjustment element, an electronic pressure regulator with an electro-hydraulic adjustment element, and an electronic pressure regulator with an electro-mechanical adjustment element, which respectively effectuates an adjustment of a stroke volume of said hydraulic machine.

11. The power conversion system according to claim 8, wherein said second regulator device is a rotational speed regulator that is so connected and adapted to be active in said first operating mode in which said hydraulic machine operates as said hydraulic motor which is secondarily rotational speed regulated by said adjustment device, responsive to control signals received from said second regulator device, dependent on an output rotational speed of said first rotatable power input/output element sensed by said rotational speed sensor, and wherein said first operating mode is activated by activation of said hydraulic switching arrangement to allow hydraulic fluid to flow from the on-board hydraulic system to said hydraulic machine.

12. The power conversion system according to claim 11, wherein said rotational speed regulator is adapted to regulate said hydraulic machine to operate as said hydraulic motor at a specified rotational speed such that said electrical machine operating as said electrical generator in said first operating mode produces electrical power having a specified power frequency that can be supplied into the on-board electrical system.

13. The power conversion system according to claim 11, wherein said second regulator device and said rotational speed sensor together form at least one of a hydro-mechanical speed regulator, an electrical speed regulator, and an electro-mechanical speed regulator.

14. The power conversion system according to claim 8, wherein said first regulator device and said second regulator device are integrated together in a single regulator unit, and said single regulator unit is connected to at least one of said hydraulic switching arrangement and said control unit for receiving activation signals therefrom for activating a selected one of said first and second regulator devices dependent upon activation of a selected one of said first and second operating modes.

15. The power conversion system according to claim 8, wherein said first regulator device is an electronic regulator that is so connected to said control unit and so adapted to be active in said second operating mode to carry out, in cooperation with said adjustment device, at least one regulation mode selected from a start-up regulation mode in which a stroke displacement of said hydraulic machine is adjusted to a nearly null-stroke minimum during a start-up phase of said hydraulic machine operating as a pump until said electrical machine substantially reaches its nominal synchronous rotational speed, a constant pressure regulation mode in which said hydraulic machine is regulated so that an output hydraulic pressure thereof is substantially constant and equal to a nominal system pressure of the on-board hydraulic system, and a variable pressure regulation mode in which said hydraulic machine is regulated with a soft cut-off characteristic to provide an output hydraulic pressure that is variable dependent on a fluid flow rate being pumped by said hydraulic machine.

16. The power conversion system according to claim 1, wherein said hydraulic switching arrangement comprises a hydraulic valve assembly selected from the group consisting of two valve members connected in parallel to each other, and a single combination valve that provides functions of two valve elements connected in parallel to each other.

17. The power conversion system according to claim 16, wherein said hydraulic valve assembly is said two valve members connected in parallel to each other, and wherein said two valve members are a first valve and a second valve that each have a first fluid opening connected to said first port of said hydraulic switching arrangement and a second fluid opening connected to said second port of said hydraulic switching arrangement.

18. The power conversion system according to claim 17, wherein said first valve is a non-return valve and said second valve is a positively controllable switchable shut-off valve.

19. The power conversion system according to claim 16, wherein said hydraulic valve assembly is adapted to perform the function of a non-return valve preventing fluid from flowing from the on-board hydraulic system to the hydraulic machine in a non-activated default condition, and is adapted to perform the function of an open shut-off valve allowing fluid to flow from the on-board hydraulic system to the hydraulic machine in a positively activated condition.

20. The power conversion system according to claim 1, wherein said electrical switching arrangement is adapted to carry out switching between a first switch mode in which electrical power generated by said electrical machine operating in said first operating mode is electrically coupled into the on-board electrical system and a second switch mode in which electrical power is coupled from the on-board electrical system to said electrical machine so as to drive said electrical machine as said electrical motor in said second operating mode.

21. The power conversion system according to claim 1, wherein said electrical switching arrangement is adapted to selectively electrically connect said electrical machine to and isolate said electrical machine from the on-board electrical system.

22. The power conversion system according to claim 1, wherein said electrical machine has a control input terminal, and further comprising a voltage regulator interconnected between said control input terminal and at least a terminal of said electrical switching arrangement.

23. The power conversion system according to claim 1, further in combination with and comprising said on-board hydraulic system, wherein said power conversion system is adapted to function as a source of hydraulic power for said on-board hydraulic system while using electrical power from the on-board electrical system, and further comprising a secondary hydraulic power source connected to said on-board hydraulic system, and wherein said power conversion system is adapted to function as a source of electrical power for the on-board electrical system while using hydraulic power from said on-board hydraulic system produced by said secondary hydraulic power source.

24. A power conversion system for bi-directionally converting electrical power to and from hydraulic power, adapted to be connected to and between an on-board hydraulic system and an on-board electrical system of a vehicle, said power conversion system comprising:
- a hydraulic machine, that can operate selectively as a hydraulic motor and as a hydraulic pump, and that has a first rotatable power input/output element;
- an electrical machine, that can operate selectively as an electrical generator and as an electrical motor, and that has a second rotatable power input/output element that is mechanically coupled to said first rotatable power input/output element;
- a hydraulic switching arrangement hydraulically connected to said hydraulic machine and adapted to controllably hydraulically connect said hydraulic machine with the on-board hydraulic system;
- an electrical switching arrangement electrically connected to said electrical machine and adapted to controllably electrically connect said electrical machine with the on-board electrical system;
- a control unit connected for signal transmission to said hydraulic switching arrangement and to said electrical switching arrangement, adapted to detect at least one control data selected from an electrical operating condition of the on-board electrical system, a hydraulic operating condition of the on-board hydraulic system, and a control selection input, and adapted to actuate and control said hydraulic switching arrangement and said electrical switching arrangement responsively to said at least one control data so as to actuate a selected one of a first operating mode in which said hydraulic machine operates as said hydraulic motor and said electrical machine operates as said electrical generator, and a second operating mode in which said electrical machine operates as said electrical motor and said hydraulic machine operates as said hydraulic pump, responsively to said at least one control data; and
- an electronic power control unit that is electrically connected to at least one terminal of said electrical switching arrangement and that is further adapted to be connected to the on-board electrical system so as to form an electrical series connection, in order, of said electrical machine, said electrical switching arrangement, said electronic power control unit and the on-board electrical system.

25. The power conversion system according to claim 24, wherein said electronic power control unit comprises a rectifier, a DC/AC converter and an electrical filter, in order, electrically connected in series with each other.

26. The power conversion system according to claim 24, wherein said electronic power control unit comprises a rectifier and a DC/AC converter connected to one another in series, said DC/AC converter is connected to said at least one terminal of said electrical switching arrangement, and said rectifier has an electrical connection adapted to be connected to the on-board electrical system so as to provide electrical power from the on-board electrical system to said rectifier.

27. The power conversion system according to claim 26, wherein said electronic power control unit further comprises an electrical filter that is selectively electrically connectable to said DC/AC converter electrically downstream thereof.

28. The power conversion system according to claim 24, wherein said electronic power control unit comprises a rectifier and a DC/AC converter connected to one another in series, said rectifier is connected to said at least one terminal of said electrical switching arrangement, and said DC/AC converter has an electrical connection adapted to be connected to the on-board electrical system so as to supply electrical power from the DC/AC converter to the on-board electrical system.

29. The power conversion system according to claim 28, wherein said electronic power control unit further comprises an electrical filter that is selectively electrically connectable to said DC/AC converter electrically downstream thereof.

30. The power conversion system according to claim 24, wherein said electrical switching arrangement comprises a multi-pole electrical pole reversal switch having a root contact set electrically connected to said electrical machine, a first selectable switch terminal set that is selectably coupleable with said root contact set and that is adapted to be connected to the on-board electrical system, and a second selectable switch terminal set that is selectably coupleable with said root contact set separately from said first selectable switch terminal set and that includes said at least one terminal and that is connected to said electronic power control unit.

31. The power conversion system according to claim 30, wherein said electronic power control unit comprises a rectifier, a DC/AC converter and an electrical filter, in order, electrically connected in series with each other, wherein said pole reversal switch further has another selectable switch terminal set that is selectably coupleable with said root contact set, wherein said rectifier is connected to said second selectable switch terminal set, and wherein said electrical filter is connected to said another selectable switch terminal set.

32. The power conversion system according to claim 30, wherein said electrical machine has a control input terminal, and further comprising a voltage regulator interconnected between said control input terminal and at least a terminal of said pole reversal switch.

33. The power conversion system of claim 24,
- wherein said electronic power control unit comprises a rectifier, a DC/AC converter and an electrical filter, in order, electrically connected in series with each other,
- wherein said electrical switching arrangement comprises a multi-pole electrical pole reversal switch having a root contact set electrically connected to said electrical machine, a first selectable switch terminal set that is selectably coupleable with said root contact set and that is adapted to be connected to the on-board electrical system, and a second selectable switch terminal set that is selectably coupleable with said root contact set separately from said first selectable switch terminal set and that includes said at least one terminal and that is connected to said electronic power control unit,
- wherein the on-board electrical system includes a first power bus and a second power bus separate from the first power bus, and wherein said first selectable switch terminal set of said pole reversal switch is adapted to be connected to the first power bus and said electrical filter is adapted to be connected to the second power bus.

34. The power conversion system according to claim 24, wherein said electronic power control unit comprises a power semiconductor-based voltage and frequency converter, and
wherein said electrical switching arrangement is adapted to connect said electical machine, operating as said generator in said first operating mode, to said electronic power control unit, so as to convert and condition electrical power generated by said electrical machine in such a manner as to match voltage, current, and frequency characteristics required in the on-board electrical system.

35. The power conversion system according to claim 35, wherein said electrical switching arrangement is further adapted to connect said electrical machine, operating as said motor in said second operating mode, to said electronic power control unit, so as to convert and condition electrical power taken from the on-board electrical system and provided to drive said electrical machine as said motor in such a manner as to achieve at least one of a smooth run-up and a rotation speed regulation of said electrical machine.

36. The power conversion system according to claim 24, wherein said electrical machine is a three-phase synchronous AC electrical motor/generator, and
wherein said electrical switching arrangement is adapted to disconnect said electronic power control unit from said electrical machine and to connect said electrical machine to the on-board electrical system in said second operating mode in which said electrical machine operates as said motor using electical power from the on-board electrical system.

37. The power conversion system according to claim 24, wherein said electrical machine is a three-phase AC generator having a fluctuating rotational speed in said first operating mode, and
wherein said electrical switching arrangement is adapted to connect said electrical machine to said electronic power control unit in said first operating mode, and said electronic power control unit is adapted to convert and condition electrical power generated by said electrical machine to provide to the on-board electrical system conditioned power having a constant voltage and a constant frequency.

38. A power conversion system for bi-directionally converting electrical power to and from hydraulic power, adapted to be connected to and between an on-board hydraulic system and an on-board electrical system of a vehicle, said power conversion system comprising:
a hydraulic machine, that can operate selectively as a hydraulic motor and as a hydraulic pump, and that has a first rotatable power input/output element;
an electrical machine, that can operate selectively as an electrical generator and as an electrical motor, and that has a second rotatable power input/output element that is mechanically coupled to said first rotatable power input/output element;
a hydraulic switching arrangement hydraulically connected to said hydraulic machine and adapted to controllably hydraulically connect said hydraulic machine with the on-board hydraulic system;
an electrical switching arrangement electrically connected to said electrical machine and adapted to controllably electrically connect said electrical machine with the on-board electrical system;
a control unit that:
comprises an operating mode logic circuit,
is connected for signal transmission to said hydraulic switching arrangement and to said electrical switching arrangement,
is adapted to detect at least one control data selected from an electrical operating condition of the on-board electrical system, a hydraulic operating condition of the on-board hydraulic system, and a control selection input, and
is adapted to actuate and control said hydraulic switching arrangement and said electrical switching arrangement responsively to said at least one control data so as to actuate a selected one of a first operating mode in which said hydraulic machine operates as said hydraulic motor and said electrical machine operates as said electrical generator, and a second operating mode in which said electrical machine operates as said electrical motor and said hydraulic machine operates as said hydraulic pump, responsively to said at least one control data;
at least one pressure sensor adapted to be connected to and sense a hydraulic pressure in the on-board hydraulic system;
at least one pressure signal line connecting said at least one pressure sensor to said operating mode logic circuit for transmitting a pressure dependent data signal indicative of said hydraulic pressure in the on-board hydraulic system from said at least one pressure sensor to said operating mode logic circuit;
at least one voltage sensor adapted to be connected to and sense a voltage in the on-board electrical system;
at least one voltage signal line connecting said at least one voltage sensor to said operating mode logic circuit for transmitting a voltage dependent data signal indicative of said voltage in the on-board electrical system from said at least one voltage sensor to said operating mode logic circuit;
at least one controllable electrical disconnect switch connected to said electrical switching arrangement and adapted to be connected to the on-board electrical system interposed between said electrical switching arrangement and the on-board electrical system; and
respective control signal lines connecting said operating mode logic circuit respectively to said hydraulic switching arrangement, said electrical switching arrangement and said at least one disconnect switch; and
wherein said operating mode logic circuit is adapted to evaluate said data signals, to generate control signals dependent thereon and responsive thereto, and to transmit said control signals onto said control signal lines.

39. The power conversion system according to claim 38, further comprising a hydraulic machine control and regulation unit connected to said hydraulic machine for controlling and regulating the operation thereof, and a further one of said control signal lines connecting said operating mode logic circuit to said hydraulic machine control and regulation unit, wherein said control signals actuate and control said hydraulic switching arrangement, said electrical switching arrangement, said hydraulic machine control and regulation unit, and said at least one disconnect switch to actuate said selected first or second operating mode.

40. The power conversion system according to claim 39, wherein said hydraulic switching arrangement comprises a hydraulic valve assembly comprising a first valve and a second valve, said control and regulation unit comprises a first regulator device and a second regulator device, said electrical switching arrangement comprises a multi-pole electrical pole reversing switch having a controllable switch element and having a control input terminal, and respective ones of said control signal lines connect said operating mode logic circuit to said second valve, said first regulator device, said second regulator device, and said control input terminal of said pole reversing switch.

41. The power conversion system according to claim 38, further comprising a user input and monitoring unit adapted to allow control commands to be manually input and system status information to be displayed, and a command input line connecting said user input and monitoring unit to said operating mode logic circuit for transmitting control commands thereto, and wherein said operating mode logic circuit is adapted to react to said control commands by responsively and selectively activating an automatic control mode, deactivating an automatic control mode, overriding an automatic control mode, and activating a test operation.

42. In an air-craft having at least one engine, at least one primary hydraulic pump connected to one engine of said at least one engine to be driven thereby, a hydraulic conduit system hydraulically connected to said at least one primary hydraulic pump, at least one primary electrical generator connected to one engine of said at least one engine to be driven thereby, and an electrical conductor system electrically connected to said at least one primary electrical generator, an improved power conversion and transfer system interconnected between said hydraulic conduit system and said electrical conductor system for bi-directionally converting and transferring electrical power in said electrical conductor system to and from hydraulic power in said hydraulic conduit system, said improved system comprising:

a hydraulic machine, that can operate selectively as a hydraulic motor and as a hydraulic pump, and that has a first rotatable power input/output element and a first hydraulic port;

an electrical machine, that can operate selectively as an electrical generator and as an electrical motor, and that has a second rotatable power input/output element that is mechanically coupled to said first rotatable power input/output element;

a hydraulic switching arrangement hydraulically connected to said hydraulic machine and controllably hydraulically connecting said hydraulic machine with said hydraulic conduit system, wherein said hydraulic switching arrangement has a first port hydraulically connected to said hydraulic conduit system and a second port connected to said first hydraulic port of said hydraulic machine;

an electrical switching arrangement electrically connected to said electrical machine and controllably electrically connecting said electrical machine with said electrical conductor system;

a control unit connected for signal transmission to said hydraulic switching arrangement and to said electrical switching arrangement, adapted to detect at least one control data selected from an electrical operating condition of said electrical conductor system, a hydraulic operating condition of said hydraulic conduit system, and a control selection input, and adapted to actuate and control said hydraulic switching arrangement and said electrical switching arrangement responsively to said at least one control data so as to actuate a selected one of a first operating mode in which said hydraulic machine operates as said hydraulic motor and said electrical machine operates as said electrical generator, and a second operating mode in which said electrical machine operates as said electrical motor and said hydraulic machine operates as said hydraulic pump, responsively to said at least one control data;

a hydraulic machine control and regulation unit connected to said hydraulic machine for controlling and regulating the operation thereof;

a first pressure sensor adapted to sense a system pressure in said hydraulic conduit system and connected for signal transmission to said control unit;

a second pressure sensor interposed and adapted to sense a hydraulic pressure prevailing between said second port of said hydraulic switching arrangement and said first hydraulic port of said hydraulic machine and connected for signal transmission to said hydraulic machine control and regulation unit; and a rotational speed sensor arranged and adapted to sense a rotational speed of said first rotatable power input/output element of said hydraulic machine and connected for signal transmission to said hydraulic machine control and regulation unit.

* * * * *

UNITED STATES PATENT AND TRADEMARK OFFICE
CERTIFICATE OF CORRECTION

PATENT NO. : 6,023,134
DATED : Feb. 8, 2000
INVENTOR(S) : Carl et al.

It is certified that error appears in the above-identified patent and that said Letters Patent is hereby corrected as shown below:

Title Page: Priority Information is missing and should read as follows:

--[30] Foreign Priority Application Data

Oct. 25, 1996 [DE]    Germany............ 196 44 340.7--;

Oct. 16, 1997 [DE]    Germany............ 197 45 747.9--;

Col. 2, line 58, before "and", replace "(10A'10B')" by --(10A', 10B');

Col. 13, line 49, after "the" (third occurrence), replace "D(/AC" by --DC/AC--;

Col. 19, line 63, before "present ", delete "1o";

Col. 29, line 17, after "claim", replace "35" by --34--;

Signed and Sealed this

Second Day of January, 2001

Attest:

Q. TODD DICKINSON

*Attesting Officer*    *Commissioner of Patents and Trademarks*